United States Patent
Li et al.

(10) Patent No.: US 10,004,000 B2
(45) Date of Patent: Jun. 19, 2018

(54) BROADCAST CONTROL BANDWIDTH ALLOCATION AND DATA TRANSCEIVING METHOD AND APPARATUS

(71) Applicant: HUAWEI TECHNOLOGIES CO., LTD., Shenzhen (CN)

(72) Inventors: Zhenyu Li, Beijing (CN); Song Zhu, Beijing (CN); Xiaolong Guo, Beijing (CN); Zhiqin Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 71 days.

(21) Appl. No.: 15/192,054

(22) Filed: Jun. 24, 2016

(65) Prior Publication Data
US 2016/0309367 A1 Oct. 20, 2016

Related U.S. Application Data

(63) Continuation of application No. PCT/CN2013/090753, filed on Dec. 27, 2013.

(51) Int. Cl.
*H04W 28/20* (2009.01)
*H04L 12/64* (2006.01)
(Continued)

(52) U.S. Cl.
CPC ......... *H04W 28/20* (2013.01); *H04L 12/6418* (2013.01); *H04W 4/02* (2013.01);
(Continued)

(58) Field of Classification Search
CPC ........... H04W 72/042; H04W 72/0406; H04W 72/0413; H04W 72/0453; H04W 4/06
See application file for complete search history.

(56) References Cited

U.S. PATENT DOCUMENTS 7,519,034 B2   4/2009  So et al.
2010/0278137 A1* 11/2010 Kwon ................. H04J 13/0059
                                                          370/330

(Continued)

FOREIGN PATENT DOCUMENTS

CN     1852073 A    10/2006
CN   101232486 A     7/2008
(Continued)

OTHER PUBLICATIONS

"Coverage Report During Random Access and PRACH Formats/Configurations", 3GPP TSG-RAN WG! #74b, R1-134442, MediaTek Inc., Oct. 7-11, 2013, Guangzhou, P.R. China, pp. 1-4.
(Continued)

*Primary Examiner* — Jung Park
(74) *Attorney, Agent, or Firm* — Staas & Halsey LLP

(57) ABSTRACT

Embodiments of the present invention provide a broadcast control bandwidth allocation and data transceiving method. The method includes: acquiring location information and channel distribution information that are of current user equipment; preprocessing a time-frequency resource of a channel according to the location information and the channel distribution information that are of the current user equipment; updating bandwidth allocation information according to the preset bandwidth and quantities of each data channel and each control channel and the preset quantities of repetitions corresponding to each data channel and each control channel; and broadcasting broadcast information to the user equipment by using a broadcast channel.

26 Claims, 23 Drawing Sheets

(51) Int. Cl.
| | |
|---|---|
| H04W 4/02 | (2018.01) |
| H04W 4/06 | (2009.01) |
| H04W 8/08 | (2009.01) |
| H04W 28/02 | (2009.01) |
| H04W 56/00 | (2009.01) |
| H04W 64/00 | (2009.01) |
| H04W 72/00 | (2009.01) |
| H04W 72/04 | (2009.01) |
| H04W 74/08 | (2009.01) |
| H04W 84/04 | (2009.01) |
| H04W 88/08 | (2009.01) |

(52) U.S. Cl.
CPC ............... *H04W 4/06* (2013.01); *H04W 8/08* (2013.01); *H04W 28/0278* (2013.01); *H04W 56/001* (2013.01); *H04W 64/00* (2013.01); *H04W 72/005* (2013.01); *H04W 72/048* (2013.01); *H04W 74/0833* (2013.01); *H04W 84/042* (2013.01); *H04W 88/08* (2013.01)

(56) References Cited

U.S. PATENT DOCUMENTS

2011/0206000 A1* 8/2011 Kwon ................. H04W 74/002
370/330

2012/0243635 A1* 9/2012 Kwon ................. H04J 13/0059
375/295
2013/0322413 A1   12/2013 Pelletier et al.
2015/0003421 A9* 1/2015 Kwon ............... H04W 72/0466
370/335

FOREIGN PATENT DOCUMENTS

CN       101990307 A      3/2011
WO      2012/037637 A1    3/2012

OTHER PUBLICATIONS

"Consideration on Contention Based and Scheduling Based Resource Allocation Schemes in D2D", 3GPP TSG RAN WG1 Meeting #74bis, R1-134815, Panasonic, Oct. 7-11, 2013, Guangzhou, P.R. China, pp. 1-4.

International Search Report and Written Opinion dated Oct. 13, 2014 in corresponding International Patent Application No. PCT/CN2013/090753.

Extended European Search Report dated Nov. 30, 2016 in corresponding European Patent Application No. 13900083.0.

International Search Report dated Oct. 13, 2014, in corresponding International Application No. PCT/CN2013/090753.

* cited by examiner

BROADCAST CONTROL BANDWIDTH ALLOCATION AND DATA TRANSCEIVING METHOD AND APPARATUS

CROSS-REFERENCE TO RELATED APPLICATIONS

This application is a continuation of International Application No. PCT/CN2013/090753, filed on Dec. 27, 2013, which is incorporated herein by reference in its entirety.

TECHNICAL FIELD

The present invention relates to the communications field, and in particular, to a broadcast control bandwidth allocation and data transceiving method and an apparatus.

BACKGROUND

With the increasing development of the science and technology, data interaction between a base station and user equipment is increasingly frequent, and accordingly, a requirement on data interaction quality is greatly improved, so that requirements of the user equipment on an area covered by a signal sent by the base station and on signal transceiving quality are becoming increasingly high.

In the prior art, two factors, that is, a cost and a coverage area, are mainly considered in M2M (machine to machine), where a coverage area is extended by means of retransmission by using a spread spectrum method, and costs of user equipment are decreased in a manner of sending data on narrowband. For example, coverage of a first distance near a base station is a normal coverage area in which a requirement for data interaction between the base station and user equipment can be satisfied without repeatedly sending data; however, coverage of a second distance (the second distance is greater than the first distance) near the base station is an extended coverage area in which retransmission (for example, 8-fold repetitions are referred to as 8X, 64-fold repetitions are referred to as 64X, or repetitions of another multiple appear) need to be performed in a spread spectrum manner to satisfy a requirement for data interaction between the base station and user equipment.

However, in a network such as a WLAN (Wireless Local Area Networks, wireless local area network) or Zigbee, a CSMA (Carrier Sense Multiple Access, carrier sense multiple access) technology is generally used to resolve a contention medium access control problem. That is, before data is sent, it is monitored whether a channel is idle; if the channel is idle, the data is immediately sent; if the channel is busy, the data is sent after a period of time until information transmission in the channel is completed. If two or more than two nodes simultaneously propose a sending request after sending of a previous segment of information is completed, it is determined as a collision. If a collision is monitored, sending of data is immediately stopped, and an attempt is made again after a period of random time. When user equipments are located in areas of different coverage levels, and user equipment that needs a larger quantity of repetitions and user equipment that needs higher channel quality contend for sending data, it is difficult for the user equipment that needs a larger quantity of repetitions to obtain a resource by means of contention, and a "starvation" phenomenon occurs. However, there is no good method in the prior art to resolve such a case.

SUMMARY

According to a broadcast control bandwidth allocation and data transceiving method and an apparatus provided in embodiments of the present invention, effective dynamic division is performed on a time-frequency channel resource of a channel, and an effective data interaction mechanism is established between user equipment and a base station, so that the user equipment is allocated with an effective resource by means of contention in a relatively fair environment, thereby avoiding a "starvation" phenomenon.

To achieve the foregoing objective, the following technical solutions are used in the embodiments of the present invention:

According to a first aspect, an embodiment of the present invention provides a broadcast control bandwidth allocation and data transceiving method, including:

acquiring location information and channel distribution information that are of each user equipment, where the location information of each user equipment is used to indicate coordinates of each user equipment, and the channel distribution information is used to indicate a channel used by each user equipment and a quantity of repetitions of sending data on the channel;

determining, according to the location information and the channel distribution information that are of each user equipment, bandwidth and quantities of data channels and control channels and quantities of repetitions corresponding to the data channel and the control channel;

updating bandwidth allocation information according to the bandwidth and the quantities of data channels and control channels and the quantities of repetitions corresponding to the data channel and the control channel, where the bandwidth allocation information is used to indicate time-frequency positions of and the quantities of repetitions of the control channel and the data channel; and sending broadcast information to each user equipment by using a broadcast channel, where the broadcast information includes at least the bandwidth allocation information, so that each user equipment determines, according to the bandwidth allocation information, a control channel and a data channel that are of a corresponding quantity of repetitions and are required for sending data, and then each user equipment chooses to receive and send data on the corresponding control channel and data channel.

In a first possible implementation manner of the first aspect, the determining, according to the location information and the channel distribution information that are of each user equipment, bandwidth and quantities of data channels and control channels and quantities of repetitions corresponding to the data channel and the control channel specifically includes:

collecting statistics on the location information and the channel distribution information that are of each user equipment to obtain user equipment allocation ratios of each data channel and each control channel that are of a corresponding quantity of repetitions;

configuring, according to the user equipment allocation ratios of each data channel and each control channel that are of the corresponding quantity of repetitions, occupied time of each data channel and each control channel that are of the corresponding quantity of repetitions; and determining, according to the occupied time of each data channel and each control channel that are of a different quantity of repetitions, the bandwidth and the quantities of data channels and control channels and the quantities of repetitions corresponding to the data channel and the control channel.

In a second possible implementation manner of the first aspect, the determining, according to the location information and the channel distribution information that are of each user equipment, bandwidth and quantities of data channels and control channels and quantities of repetitions corresponding to the data channel and the control channel specifically includes:

collecting statistics on the location information and the channel distribution information that are of each user equipment to obtain user equipment allocation ratios of each data channel and each control channel that are of a corresponding quantity of repetitions;

configuring, according to the user equipment allocation ratios of each data channel and each control channel that are of the corresponding quantity of repetitions, occupied frequencies and/or occupied time frequencies of each data channel and each control channel that are of the corresponding quantity of repetitions; and determining, according to the occupied frequencies and/or the occupied time frequencies of each data channel and each control channel that are of a different quantity of repetitions, the bandwidth and the quantities of data channels and control channels and the quantities of repetitions corresponding to the data channel and the control channel.

In a third possible implementation manner of the first aspect, after the sending broadcast information to each user equipment by using a broadcast channel, where the broadcast information includes at least the bandwidth allocation information, so that each user equipment determines, according to the bandwidth allocation information, a control channel and a data channel that are of a corresponding quantity of repetitions and are required for sending data, the method further includes:

receiving the channel distribution information and data embedded with a user equipment identity UEID (User Equipment Identity, which is a terminal identity), where the channel distribution information and the data are sent by the user equipment according to a control channel and a data channel that are of a corresponding quantity of repetitions, and the user equipment is one of the user equipments; or receiving the channel distribution information and a part of data embedded with a user equipment identity UEID and a buffer status report BSR (Buffer state report, buffer status report), where the channel distribution information and the part of data are sent by the user equipment according to a control channel and a data channel that are of a corresponding quantity of repetitions.

With reference to the foregoing third possible implementation manner of the first aspect, in a fourth possible implementation manner of the first aspect, after the receiving the channel distribution information and data embedded with a user equipment identity UEID, where the channel distribution information and the data are sent by the user equipment according to a control channel and a data channel that are of a corresponding quantity of repetitions, the method further includes:

parsing the channel distribution information and the part of data embedded with the user equipment identity UEID and the buffer status report BSR to obtain a parsed second quantity of repetitions, where the channel distribution information and the part of data are sent on the control channel and the data channel that are of the corresponding quantity of repetitions; and sending scheduling information that includes the second quantity of repetitions to the user equipment, so that the user equipment adjusts an original quantity of repetitions to the second quantity of repetitions according to the scheduling information to perform data sending.

In a fifth possible implementation manner of the first aspect, after the receiving the channel distribution information and data embedded with a user equipment identity UEID, where the channel distribution information and the data are sent by each user equipment according to a control channel and a data channel that are of a corresponding quantity of repetitions, or the receiving the channel distribution information and a part of data embedded with a user equipment identity UEID and a buffer status report BSR, where the channel distribution information and the part of data are sent by each user equipment according to a control channel and a data channel that are of a corresponding quantity of repetitions, the method further includes:

if the user equipment fails to send the data by using the control channel and the data channel that are of the corresponding quantity of repetitions, and a quantity of data retransmissions performed by the user equipment according to a random backoff probability in the broadcast information is greater than a preset maximum threshold, acquiring data that is sent by the user equipment on a control channel and a data channel that are of a corresponding third quantity of repetitions; and parsing a user equipment identity UEID embedded in the data that is on the control channel and the data channel that are of the third quantity of repetitions, so that a base station sends a control command on the control channel and the data channel that are of the third quantity of repetitions.

In a sixth possible implementation manner of the first aspect, after the receiving the channel distribution information and data embedded with a user equipment identity UEID, where the channel distribution information and the data are sent by each user equipment according to a control channel and a data channel that are of a corresponding quantity of repetitions, or the receiving the channel distribution information and a part of data embedded with a user equipment identity UEID and a buffer status report BSR, where the channel distribution information and the part of data are sent by each user equipment according to a control channel and a data channel that are of a corresponding quantity of repetitions, the method further includes:

if a quantity of repetitions required for data changes into a fourth quantity of repetitions after the user equipment completes an operation of downlink synchronization, acquiring a re-selection status that is sent by the user equipment and is of a control channel and a data channel that are of the corresponding fourth quantity of repetitions, and then completing sending of signaling to the user equipment on the control channel and the data channel that are of the fourth quantity of repetitions, where the operation of downlink synchronization is used as a synchronization operation of eliminating a time difference between the user equipment and a base station caused by sleeping of the user equipment.

According to a second aspect, an embodiment of the present invention provides a broadcast control bandwidth allocation and data transceiving method, including:

receiving broadcast information broadcast by a base station, where the broadcast information includes at least bandwidth allocation information, the bandwidth allocation information is determined by the base station by acquiring location information and channel distribution information that are of each user equipment, where the location information of each user equipment is used to indicate coordinates of each user equipment, and the channel distribution information is used to indicate a channel used by each user equipment and a quantity of repetitions of sending data on the channel; and then, by determining, by the base station according to the location information and the channel distribution information that are of each user equipment, bandwidth and quantities of data channels and control channels and quantities of repetitions corresponding to the data channel and the control channel, and further by updating the bandwidth allocation information according to the bandwidth and the quantities of data channels and control channels and the quantities of repetitions corresponding to the data channel and the control channel, where the bandwidth allocation information includes preset bandwidth and quantities of each data channel and each control channel and preset quantities of repetitions corresponding to each data channel and each control channel, frequency channel number positions of uplink and downlink narrowband, and a position fixedly used as a time-frequency resource position of a random access channel RACH, where the time-frequency resource position of the random access channel RACH is used to indicate a position of a resource that is used for competitive access;

determining, according to the broadcast information in a broadcast channel and the recorded channel distribution information of each user equipment, a control channel and a data channel that are of a corresponding first quantity of repetitions; and sending data and the channel distribution information to the base station according to a preset rule by using the control channel and the data channel that are of the first quantity of repetitions.

In a first possible implementation manner of the second aspect, the sending data and the channel distribution information to the base station according to a preset rule by using the control channel and the data channel that are of the first quantity of repetitions specifically includes:

if the data can be completely sent within one frame, embedding a user equipment identity UEID in the transmitted data; and sending, to the base station according to the control channel and the data channel that are of the first quantity of repetitions, the channel distribution information and the data embedded with the user equipment identity UEID.

With reference to the foregoing first possible implementation manner of the second aspect, in a second possible implementation manner of the second aspect, the sending data and the channel distribution information to the base station according to a preset rule by using the control channel and the data channel that are of the first quantity of repetitions further specifically includes:

if the data cannot be completely sent within one frame, separately embedding a user equipment identity UEID and a buffer status report BSR in the transmitted data;

sending, to the base station according to the control channel and the data channel that are of the first quantity of repetitions, the channel distribution information and a part of the transmitted data embedded with the user equipment identity UEID and the buffer status report BSR;

acquiring scheduling information of the base station, where the scheduling information includes an adjusted second quantity of uplink repetitions that is obtained after the base station parses the part of data embedded with the user equipment identity UEID and the buffer status report BSR; and sending a remaining part of data to the base station according to the second quantity of repetitions in the scheduling information.

In a third possible implementation manner of the second aspect, after the determining, according to the broadcast information in a broadcast channel and a recorded running status of the user equipment, a control channel and a data channel that are of a corresponding first quantity of repetitions, the method further includes:

recording, as historical data, the first quantity of repetitions of the corresponding control channel and data channel that send the data, so that when re-sending the data, the user equipment invokes the historical data to determine the control channel and the data channel that are of the corresponding first quantity of repetitions.

In a fourth possible implementation manner of the second aspect, the determining, according to the broadcast information in a broadcast channel and a recorded running status of the user equipment, a control channel and a data channel that are of a corresponding first quantity of repetitions specifically includes:

determining whether the control channel and the data channel that are of the data and of the first quantity of repetitions are recorded;

if the control channel and the data channel that are of the data and of the first quantity of repetitions are not recorded, performing information combining on the continuously received broadcast information; and parsing the combined broadcast information according to preset parsing code to determine the control channel and the data channel that are of the corresponding first quantity of repetitions; or if the control channel and the data channel that are of the data and of the first quantity of repetitions are recorded, sending data to the base station by re-using the control channel and the data channel that are of the first quantity of repetitions.

In a fifth possible implementation manner of the second aspect, after the sending data and the channel distribution information to the base station according to a preset rule by using the control channel and the data channel that are of the first quantity of repetitions, the method further includes:

if sending the data to the base station according to the preset rule by using the control channel and the data channel that are of the first quantity of repetitions fails, performing a preset time of backoff according to random backoff time in the broadcast information;

monitoring the broadcast information in the broadcast channel; and re-sending the data to the base station according to a random backoff probability in the broadcast information.

With reference to the foregoing fifth possible implementation manner of the second aspect, in a sixth possible implementation manner of the second aspect, after the re-sending the data to the base station according to a random backoff probability in the broadcast information, the method further includes:

if a quantity of data retransmissions performed according to the random backoff probability in the broadcast information is greater than a preset maximum threshold, re-selecting, according to the current first quantity of repetitions of the control channel and the data channel, a control channel and a data channel that are of a third quantity of repetitions that is greater than the first quantity of repetitions; and sending the data and the channel distribution information to the base station according to the control channel and the data channel that are of the third quantity of repetitions, so that the base station sends signaling to the user equipment on the re-selected control channel and data channel that are of the third quantity of repetitions, where the data is embedded with a user equipment identity UEID.

In a seventh possible implementation manner of the second aspect, when the user equipment is woken up from a sleep state, the method further includes:

performing an operation of downlink synchronization with the base station, so as to eliminate a time difference between the user equipment and the base station caused by sleeping of the user equipment;

acquiring a time for completing the operation of downlink synchronization; and determining, according to the time for the operation of downlink synchronization and a preset relationship between a preset time for the operation of downlink synchronization and channel selection, a control channel and a data channel that are of a fourth quantity of repetitions.

With reference to the foregoing seventh possible implementation manner of the second aspect, in an eighth possible implementation manner of the second aspect, the method further includes: if the fourth quantity of repetitions is different from the first quantity of repetitions, sending the data and the channel distribution information to the base station according to the control channel and the data channel that are of the fourth quantity of repetitions, so that the base station sends signaling to the user equipment on the re-selected control channel and data channel that are of the fourth quantity of repetitions.

According to a third aspect, an embodiment of the present invention provides a base station, including:

a first acquiring module, configured to acquire location information and channel distribution information that are of current user equipment, where the location information of the current user equipment is used to indicate location coordinates of the current user equipment, and the channel distribution information is used to indicate information about a channel used by the current user equipment and a quantity of repetitions of using the channel;

a preprocessing module, configured to determine, according to the location information and the channel distribution information that are of each user equipment, bandwidth and quantities of data channels and control channels and quantities of repetitions corresponding to the data channel and the control channel;

an updating module, configured to update bandwidth allocation information according to the bandwidth and the quantities of data channels and control channels and the quantities of repetitions corresponding to the data channel and the control channel, where the bandwidth allocation information is used to indicate time-frequency positions of and the quantities of repetitions of the control channel and the data channel; and a first sending module, configured to send broadcast information to each user equipment by using a broadcast channel, where the broadcast information includes at least the bandwidth allocation information, so that each user equipment determines, according to the bandwidth allocation information, a control channel and a data channel that are of a corresponding quantity of repetitions and are required for sending data.

According to a fourth aspect, an embodiment of the present invention provides user equipment, including:

a second receiving module, configured to receive broadcast information broadcast by a base station, where the broadcast information includes at least bandwidth allocation information, the bandwidth allocation information is determined by the base station by acquiring location information and channel distribution information that are of each user equipment, where the location information of each user equipment is used to indicate coordinates of each user equipment, and the channel distribution information is used to indicate a channel used by each user equipment and a quantity of repetitions of sending data on the channel; and then, by determining, by the base station according to the location information and the channel distribution information that are of each user equipment, bandwidth and quantities of data channels and control channels and quantities of repetitions corresponding to the data channel and the control channel, and further by updating the bandwidth allocation information according to the bandwidth and the quantities of data channels and control channels and the quantities of repetitions corresponding to the data channel and the control channel, where the bandwidth allocation information includes preset bandwidth and quantities of each data channel and each control channel and preset quantities of repetitions corresponding to each data channel and each control channel, frequency channel number positions of uplink and downlink narrowband, and a position fixedly used as a time-frequency resource position of a random access channel RACH;

a processing module, configured to determine, according to the broadcast information in a broadcast channel and the recorded channel distribution information of each user equipment, a control channel and a data channel that are of a corresponding first quantity of repetitions; and a third sending module, configured to send data and the channel distribution information to the base station according to a preset rule by using the control channel and the data channel that are of the first quantity of repetitions.

According to a fifth aspect, an embodiment of the present invention provides a base station, including:

a processor, configured to: determine, according to location information and channel distribution information that are of each user equipment, bandwidth and quantities of data channels and control channels and quantities of repetitions corresponding to the data channel and the control channel; and update bandwidth allocation information according to the bandwidth and the quantities of data channels and control channels and the quantities of repetitions corresponding to the data channel and the control channel, where the bandwidth allocation information is used to indicate time-frequency positions of and the quantities of repetitions of the control channel and the data channel;

a sender, configured to send broadcast information to each user equipment by using a broadcast channel, where the broadcast information includes at least the bandwidth allocation information, so that each user equipment determines, according to the bandwidth allocation information, a control channel and a data channel that are of a corresponding quantity of repetitions and are required for sending data; and a receiver, configured to acquire the location information and the channel distribution information that are of each user equipment, where the location information of each user equipment is used to indicate coordinates of each user equipment, and the channel distribution information is used to indicate a channel used by each user equipment and a quantity of repetitions of sending data on the channel.

In a first possible implementation manner of the fifth aspect, the processor is further configured to: collect statistics on the location information and the channel distribution information that are of each user equipment to obtain user equipment allocation ratios of each data channel and each control channel that are of a corresponding quantity of repetitions; configure, according to the user equipment allocation ratios of each data channel and each control channel that are of the corresponding quantity of repetitions, occupied time of each data channel and each control channel that are of the corresponding quantity of repetitions; and determine, according to the occupied time of each data channel and each control channel that are of a different quantity of repetitions, the bandwidth and the quantities of data channels and control channels and the quantities of repetitions corresponding to the data channel and the control channel.

In a second possible implementation manner of the fifth aspect, the processor is further configured to: collect statistics on the location information and the channel distribution information that are of each user equipment to obtain user equipment allocation ratios of each data channel and each control channel that are of a corresponding quantity of repetitions; configure, according to the user equipment allocation ratios of each data channel and each control channel that are of the corresponding quantity of repetitions, occupied frequencies and/or occupied time frequencies of each data channel and each control channel that are of the corresponding quantity of repetitions; and determine, according to the occupied frequencies and/or the occupied time frequencies of each data channel and each control channel that are of a different quantity of repetitions, the bandwidth and the quantities of data channels and control channels and the quantities of repetitions corresponding to the data channel and the control channel.

In a third possible implementation manner of the fifth aspect, the receiver is further configured to:

receive the channel distribution information and data embedded with a user equipment identity UEID, where the channel distribution information and the data are sent by the user equipment according to a control channel and a data channel that are of a corresponding quantity of repetitions; or receive the channel distribution information and a part of data embedded with a user equipment identity UEID and a buffer status report BSR, where the channel distribution information and the part of data are sent by the user equipment according to a control channel and a data channel that are of a corresponding quantity of repetitions.

With reference to the foregoing third possible implementation manner of the fifth aspect, in a fourth possible implementation manner of the fifth aspect, the receiver is further configured to parse the channel distribution information and the part of data embedded with the user equipment identity UEID and the buffer status report BSR to obtain a parsed second quantity of repetitions, where the channel distribution information and the part of data are sent on the control channel and the data channel that are of the corresponding quantity of repetitions; and the sender is further configured to send scheduling information that includes the second quantity of repetitions to the user equipment, so that the user equipment adjusts an original quantity of repetitions to the second quantity of repetitions according to the scheduling information to perform data sending.

In a fifth possible implementation manner of the fifth aspect, the receiver is further configured to: if the user equipment fails to send the data according to the control channel and the data channel that are of the corresponding quantity of repetitions, and a quantity of data retransmissions performed by the user equipment according to a random backoff probability in the broadcast information is greater than a preset maximum threshold, acquire data that is sent by the user equipment on a control channel and a data channel that are of a corresponding third quantity of repetitions; and the processor is further configured to parse a user equipment identity UEID embedded in the data that is on the control channel and the data channel that are of the third quantity of repetitions, so that the base station sends a control command on the control channel and the data channel that are of the third quantity of repetitions.

In a sixth possible implementation manner of the fifth aspect, the receiver is further configured to: if a quantity of repetitions required for data changes into a fourth quantity of repetitions after the user equipment completes an operation of downlink synchronization, acquire a re-selection status that is sent by the user equipment and is of a control channel and a data channel that are of the corresponding fourth quantity of repetitions, so as to complete sending of signaling to the user equipment on the control channel and the data channel that are of the fourth quantity of repetitions, where the operation of downlink synchronization is used as a synchronization operation of eliminating a time difference between the user equipment and the base station caused by sleeping of the user equipment.

According to a sixth aspect, an embodiment of the present invention provides user equipment, including:

a receiver, configured to receive broadcast information broadcast by a base station, where the broadcast information includes at least bandwidth allocation information, the bandwidth allocation information is determined by the base station by acquiring location information and channel distribution information that are of each user equipment, where the location information of each user equipment is used to indicate coordinates of each user equipment, and the channel distribution information is used to indicate a channel used by each user equipment and a quantity of repetitions of sending data on the channel; and then, by determining, by the base station according to the location information and the channel distribution information that are of each user equipment, bandwidth and quantities of data channels and control channels and quantities of repetitions corresponding to the data channel and the control channel, and further by updating the bandwidth allocation information according to the bandwidth and the quantities of data channels and control channels and the quantities of repetitions corresponding to the data channel and the control channel, where the bandwidth allocation information includes preset bandwidth and quantities of each data channel and each control channel and preset quantities of repetitions corresponding to each data channel and each control channel, frequency channel number positions of uplink and downlink narrowband, and a position fixedly used as a time-frequency resource position of a random access channel RACH;

a processor, configured to determine, according to the broadcast information in a broadcast channel and a recorded running status of the user equipment, a control channel and a data channel that are of a corresponding first quantity of repetitions; and a sender, configured to send data and the channel distribution information to the base station according to a preset rule by using the control channel and the data channel that are of the first quantity of repetitions.

In a first possible implementation manner of the sixth aspect, the processor is further configured to: if it is determined that the data can be completely sent within one frame, embed a user equipment identity UEID in the transmitted data; and the sender is further configured to send, to the base station according to the control channel and the data channel that are of the first quantity of repetitions, the channel distribution information and the data embedded with the user equipment identity UEID.

With reference to the foregoing first possible implementation manner of the sixth aspect, in a second possible implementation manner of the sixth aspect, the processor is further configured to: if the data cannot be completely sent within one frame, separately embed a user equipment identity UEID and a buffer status report BSR in the transmitted data;

the receiver is further configured to acquire scheduling information of the base station, where the scheduling information includes an adjusted second quantity of uplink repetitions that is obtained after the base station parses a part of data embedded with the user equipment identity UEID and the buffer status report BSR; and the sender is further configured to: send, to the base station according to the control channel and the data channel that are of the first quantity of repetitions, the channel distribution information and the part of the transmitted data embedded with the user equipment identity UEID and the buffer status report BSR; and send a remaining part of data to the base station according to the second quantity of repetitions in the scheduling information.

In a third possible implementation manner of the sixth aspect, the user equipment further includes a memory, which is configured to record the first quantity of repetitions of the corresponding control channel and data channel that send the data, so that when re-sending the data, the user equipment determines the control channel and the data channel that are of the corresponding first quantity of repetitions.

In a fourth possible implementation manner of the sixth aspect, the processor is further configured to: determine whether the control channel and the data channel that are of the data and of the first quantity of repetitions are recorded; and if the control channel and the data channel that are of the data and of the first quantity of repetitions are not recorded, perform information combining on the continuously received broadcast information, and parse the combined broadcast information according to preset parsing code to determine the control channel and the data channel that are of the corresponding first quantity of repetitions; or if the control channel and the data channel that are of the data and of the first quantity of repetitions are recorded, send data to the base station by re-using the control channel and the data channel that are of the first quantity of repetitions.

In a fifth possible implementation manner of the sixth aspect, the processor is further configured to: if sending the data to the base station according to the preset rule by using the control channel and the data channel that are of the first quantity of repetitions fails, perform a preset time of backoff according to random backoff time in the broadcast information; and monitor the broadcast information in the broadcast channel; and the sender is further configured to re-send the data to the base station according to a random backoff probability in the broadcast information.

With reference to the foregoing fifth possible implementation manner of the sixth aspect, in a sixth possible implementation manner of the sixth aspect, the processor is further configured to: if a quantity of data retransmissions performed according to the random backoff probability in the broadcast information is greater than a preset maximum threshold, re-select, according to the current first quantity of repetitions of the control channel and the data channel, a control channel and a data channel that are of a third quantity of repetitions that is greater than the first quantity of repetitions; and the sender is further configured to send the data and the channel distribution information to the base station according to the control channel and the data channel that are of the third quantity of repetitions, so that the base station sends signaling to the user equipment on the re-selected control channel and data channel that are of the third quantity of repetitions, where the data is embedded with a user equipment identity UEID.

In a seventh possible implementation manner of the sixth aspect, the processor is further configured to: perform an operation of downlink synchronization with the base station, so as to eliminate a time difference between the user equipment and the base station caused by sleeping of the user equipment; and determine, according to a time for the operation of downlink synchronization and a preset relationship between a preset time for the operation of downlink synchronization and channel selection, a control channel and a data channel that are of a fourth quantity of repetitions; and the receiver is further configured to acquire the time for completing the operation of downlink synchronization.

With reference to the foregoing seventh possible implementation manner of the sixth aspect, in an eighth possible implementation manner of the sixth aspect, the sender is further configured to send the data and the channel distribution information to the base station according to the control channel and the data channel that are of the fourth quantity of repetitions, so that the base station sends signaling to the user equipment on the re-selected control channel and data channel that are of the fourth quantity of repetitions.

According to the broadcast control bandwidth allocation and data transceiving method and the apparatus provided in the embodiments of the present invention, location information and channel distribution information that are of each user equipment are acquired, bandwidth and quantities of data channels and control channels and quantities of repetitions corresponding to each data channel and each control channel are determined, and then bandwidth allocation information is updated according to the bandwidth and the quantities of data channels and control channels and the quantities of repetitions corresponding to each data channel and each control channel, where the bandwidth allocation information includes frequency channel number positions of uplink and downlink narrowband and a position fixedly used as a time-frequency resource position of a random access channel RACH; then, broadcast information is sent to the user equipment, where the broadcast information in a broadcast channel includes at least the bandwidth allocation information, so that each user equipment determines, according to the bandwidth allocation information, a control channel and a data channel that are of a corresponding quantity of repetitions and are required for sending data. In the solution, preprocessing is performed on a time-frequency resource of a channel according to a use status fed back by user equipment, and effective dynamic division is performed on the time-frequency resource of the channel, so as to change a conventional common mode of a channel into a multiplexing mode in which time division or frequency division or time-frequency division is performed on a channel according to a real-time use status of the user equipment, which greatly improves utilization efficiency of the original channel, and effectively avoids a "starvation" phenomenon. In addition, broadcast information is sent to each user equipment by means of broadcast, and then the user equipment performs channel selection according to the broadcast information, which implements semi-static adjustment performed by a base station on the user equipment, and optimizes a process of performing data interaction between the base station and the user equipment.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
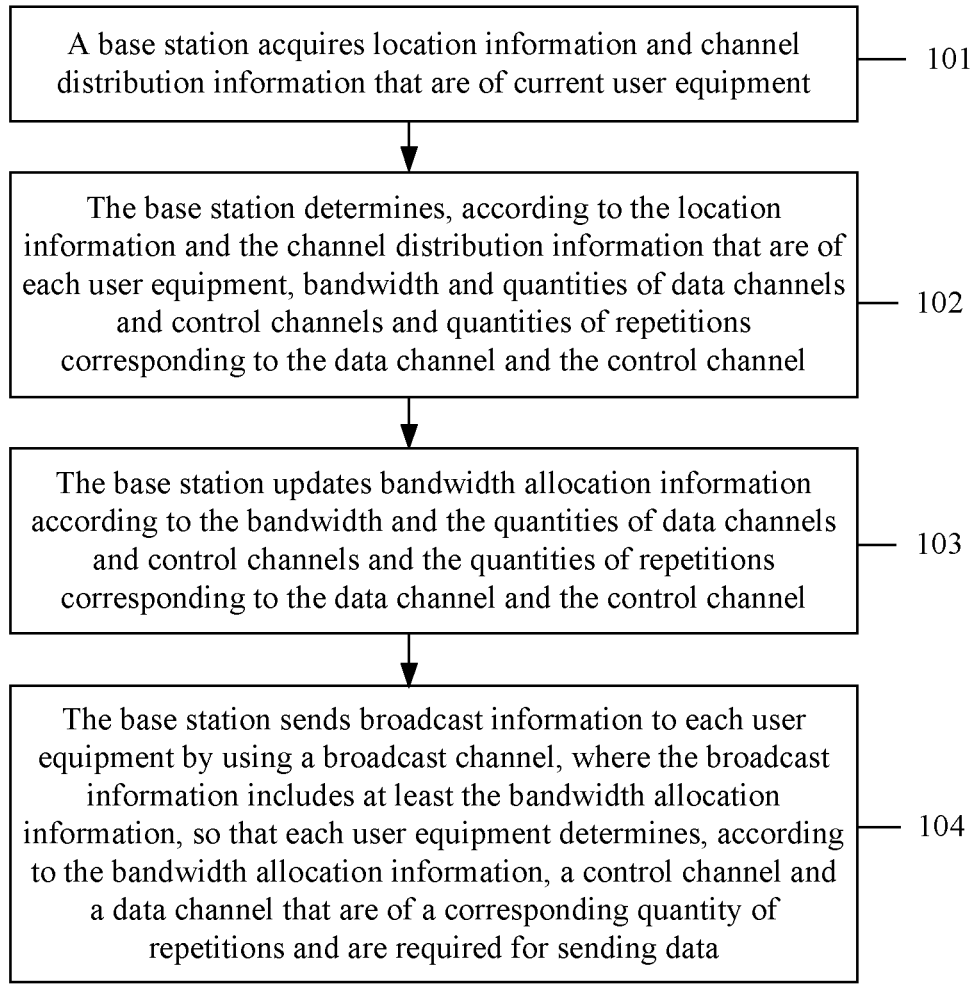
FIG. 1 is a schematic flowchart 1 of a broadcast control bandwidth allocation and data transceiving method according to an embodiment of the present invention.

The following clearly and describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention are applied in a radio communications system, where the radio communications system includes at least user equipment and a base station.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (such as RAN, Radio Access Network). The wireless terminal may be a mobile terminal, such as a mobile phone (also referred to as a "cellular" phone), and a computer with a mobile terminal.

The base station (for example, an access point) may refer to a device in communication with a wireless terminal via one or more sectors at an air interface in an access network. The base station may be used to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base transceiver station (BTS, Base Transceiver Station) in GSM or CDMA, may be a NodeB (NodeB) in WCDMA, or may be an evolved NodeB (NodeB, eNB, or e-NodeB, evolutional Node B) in LTE, which is not limited in the present invention.

According to a broadcast control bandwidth allocation and data transceiving method provided in the embodiments of the present invention, preprocessing is performed on a time-frequency resource of a channel, and effective dynamic division is performed on the time-frequency resource of the channel; then, a base station writes, into bandwidth allocation information in broadcast information, preset bandwidth and quantities of each data channel and each control channel and preset quantities of repetitions corresponding to each data channel and each control channel. After receiving the broadcast information, user equipment accordingly obtains a scheme for performing effective dynamic division on the time-frequency resource of the channel, that is, the bandwidth and the quantities of each data channel and each control channel and the quantities of repetitions corresponding to each data channel and each control channel; the user equipment parses parameters in the broadcast information, so as to complete a corresponding channel selection operation, and perform data interaction with the base station according to a selected channel and a corresponding quantity of repetitions.

Embodiment 1

An embodiment of the present invention provides a broadcast control bandwidth allocation and data transceiving method. As shown in FIG. 1, the method includes the following steps:

101. A base station acquires location information and channel distribution information that are of current user equipment.

The location information of the user equipment is used to indicate location coordinates of the current user equipment, and the channel distribution information is used to indicate a channel used by each user equipment and a quantity of repetitions of sending data on the channel. For example, channel distribution information of user equipment A includes that a channel used by the user equipment A is a channel X, and a quantity of repetitions used when data interaction is performed between the user equipment A and the base station on the channel X is 64X (that is, 64 retransmissions).

Figure 2:
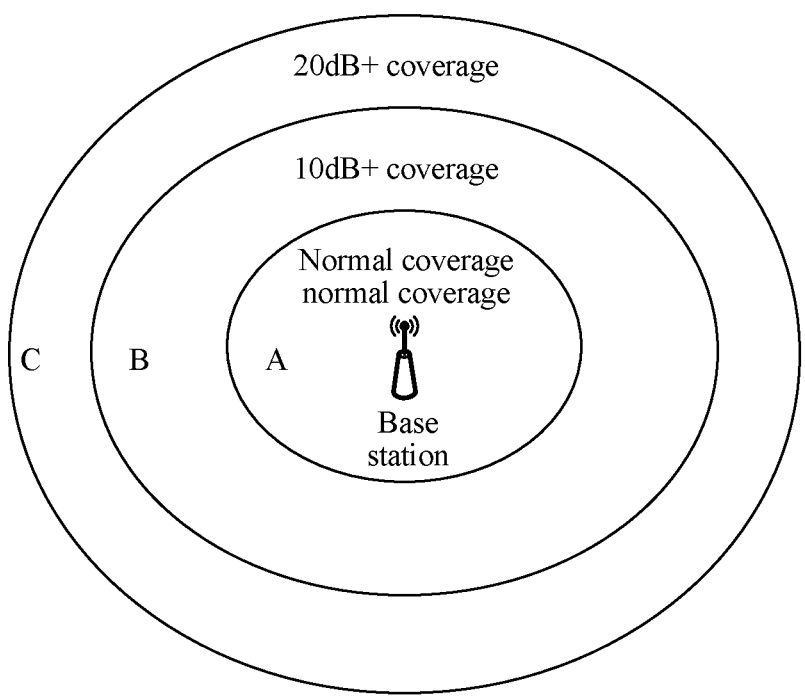
FIG. 2 is a schematic diagram of division of coverage area levels of a signal sent by a base station according to the prior art.

Specifically, the location information of the user equipment includes information about a coordinate position and a coverage level that are of the user equipment in a coverage area of the base station. Exemplarily, when data interaction is performed between the base station and the user equipment, areas covered by the base station are divided into different levels according to a quantity of repetitions required for sending data. As shown in FIG. 2, an area A is a common coverage area in which data interaction between the base station and the user equipment can be completed without performing spread spectrum (referred to as 1X); an area B/C is an extended coverage area in which data interaction between the base station and the user equipment needs to be completed in a manner of spread spectrum, that is, retransmissions (for example, 8-fold repetitions are referred to as 8X, 64-fold repetitions are referred to as 64X, or repetitions of another multiple appear). When user equipments are located in areas of different coverage levels, and a terminal that needs a larger quantity of repetitions and a terminal that needs a smaller quantity of repetitions contend for sending data, it is difficult for the former to obtain a resource by means of contention.

102. The base station determines, according to the location information and the channel distribution information that are of each user equipment, bandwidth and quantities of data channels and control channels and quantities of repetitions corresponding to the data channel and the control channel.

In the broadcast control bandwidth allocation and data transceiving method provided in this embodiment of the present invention, preprocessing is performed on a time-frequency resource of a channel, and effective dynamic division is performed on the time-frequency resource of the channel, so as to change a conventional common mode of a channel into a multiplexing mode in which time division or frequency division or time-frequency division is performed on the channel according to a real-time use status of the user equipment, which greatly improves utilization efficiency of the original channel.

Figure 3:
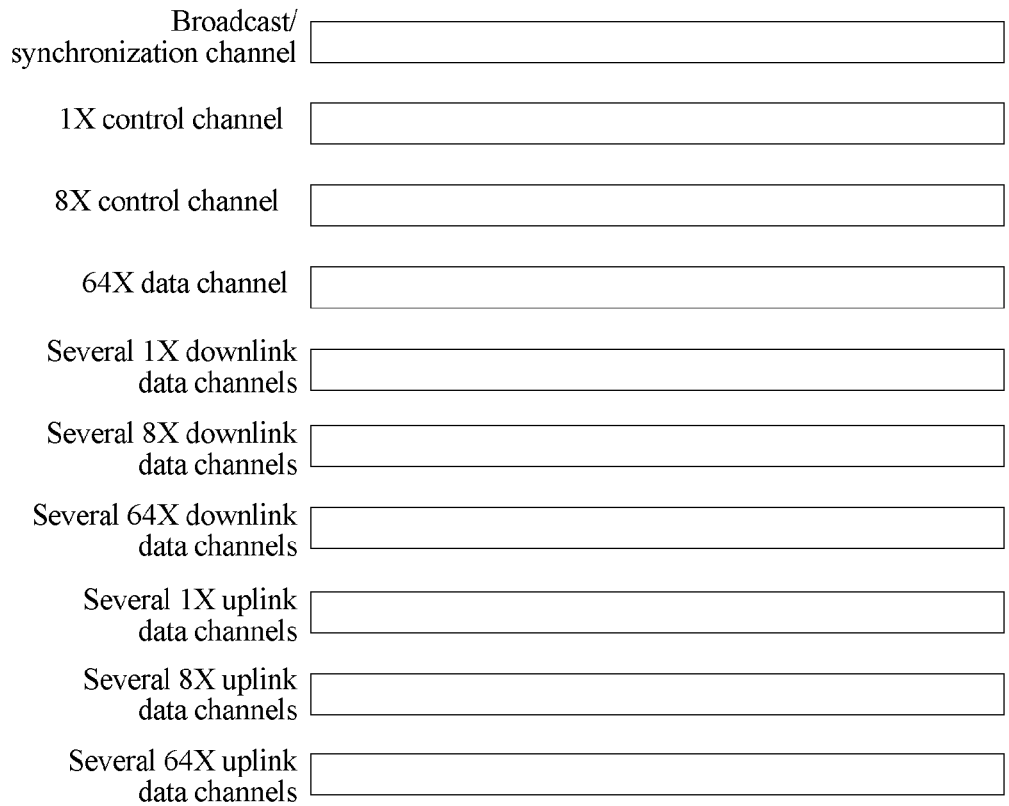
FIG. 3 is a schematic diagram of a time-frequency resource of a channel according to an embodiment of the present invention.

As shown in FIG. 3, the time-frequency resource of the channel includes: one broadcast channel, data channels of different multiples of repetitions, and several corresponding control channels. The base station performs preprocessing on the use status fed back by the user equipment, so as to determine bandwidth and quantities of each data channel and each control channel and quantities of repetitions corresponding to each data channel and each control channel that are used when data interaction is performed between the base station and the user equipment.

It should be noted that a specific method for preprocessing the time-frequency resource of the channel by the base station is described in detail in Embodiment 2, and therefore, details are not provided herein.

103. The base station updates bandwidth allocation information according to the bandwidth and the quantities of data channels and control channels and the quantities of repetitions corresponding to the data channel and the control channel.

The bandwidth allocation information includes bandwidth and quantities of each data channel and each control channel, quantities of repetitions corresponding to each data channel and each control channel, frequency channel number positions of uplink and downlink narrowband, and a position fixedly used as a time-frequency resource position of a random access channel RACH.

Further, the bandwidth and the quantities of each data channel and each control channel and the quantities of repetitions corresponding to each data channel and each control channel are obtained by the base station by performing preprocessing on the time-frequency resource of the channel according to the use status fed back by the user equipment. The frequency channel number positions of the uplink and downlink narrowband are used to indicate frequency band resources occupied by the uplink and downlink narrowband. Specifically, a method of stipulating a protocol may be used: First, a table is stipulated by using the protocol, and then only a specific configuration that needs to be carried in the bandwidth allocation information is written into the table for index query, or information source display may be directly used to specify a central frequency channel number position of each channel. The RACH (Random Access Channel, random access channel) is an uplink transmission channel; data receiving is always performed on the RACH within an entire cell, and open loop power control is used.

Specifically, because of a change of a running status of the user equipment, the base station performs preprocessing on the time-frequency resource of the channel according to the use status fed back by the user equipment to obtain the bandwidth and the quantities of each data channel and each control channel, and re-writes this information into the bandwidth allocation information, which overwrites the original bandwidth allocation information. For example, after preprocessing is performed on the time-frequency resource of the channel according to the use status fed back by the user equipment, the base station determines that a current time-frequency resource allocation status is as follows: One 1X control channel and one 1X data channel, eight 8X control channels and eight 8X data channels, and sixteen 16X control channels and sixteen 16X data channels. Then, the base station writes this allocation information into the bandwidth allocation information, which overwrites the original bandwidth allocation information.

104. The base station sends broadcast information to each user equipment by using a broadcast channel, where the broadcast information includes at least the bandwidth allocation information, so that each user equipment determines, according to the bandwidth allocation information, a control channel and a data channel that are of a corresponding quantity of repetitions and are required for sending data.

Specifically, the base station sends the broadcast information to the user equipment by using the broadcast channel, where the broadcast information in the broadcast channel includes at least the bandwidth allocation information, so that the user equipment determines, according to the broadcast information, a control channel and a data channel that are of a first quantity of repetitions and are required for transferring data.

Further, the acquiring data and the channel distribution information that are sent by the user equipment according to the control channel and the data channel that are of the first quantity of repetitions includes the following two cases:

acquiring the channel distribution information and data embedded with a user equipment identity UEID, where the channel distribution information and the data are sent by the user equipment according to the control channel and the data channel that are of the first quantity of repetitions, or acquiring the channel distribution information and a part of data embedded with a user equipment identity UEID and a buffer status report BSR, where the channel distribution information and the part of data are sent by the user equipment according to the control channel and the data channel that are of the first quantity of repetitions.

Specifically, after the base station sends the broadcast information to the user equipment, the user equipment determines, according to the broadcast information in the broadcast channel and a recorded running status of the user equipment, the control channel and the data channel that are of the corresponding first quantity of repetitions, and then sends data and the channel distribution information to the base station. When sending the data and the channel distribution information, the user equipment determines whether the data can be completely sent within one frame. If the data can be completely sent within one frame, that is, sending of a small packet of data, as shown in FIG. 6, the user equipment embeds a user equipment identity UEID in the transmitted data and sends the transmitted data to the base station, so that the base station acquires the channel distribution information and the data embedded with the user equipment identity UEID, where the channel distribution information and the data are sent by the user equipment according to the control channel and the data channel that are of the first quantity of repetitions.

Figure 6:
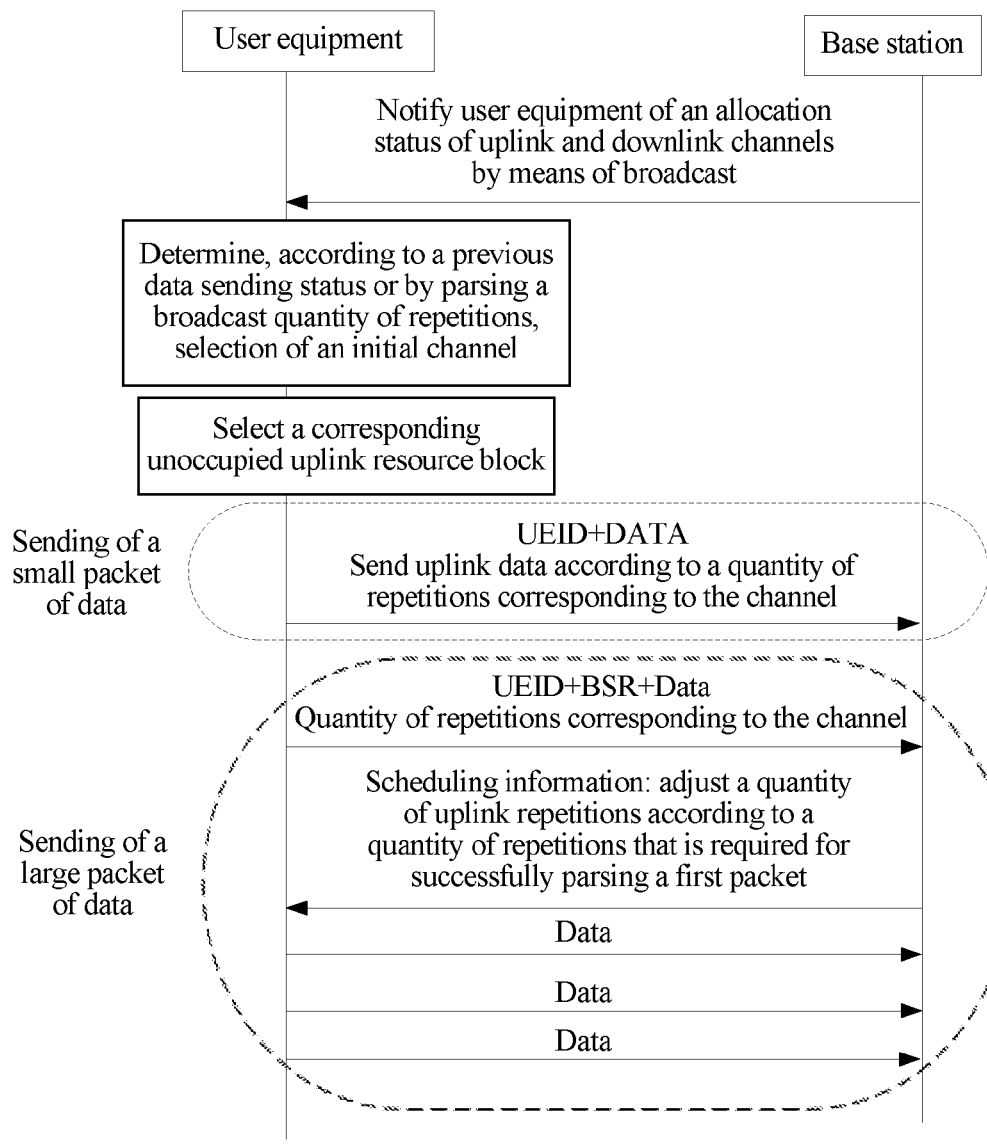
FIG. 6 is a specific schematic diagram 1 of performing data interaction by using a broadcast control bandwidth allocation and data transceiving method according to an embodiment of the present invention.

If the data cannot be sent within one frame, that is, sending of a large packet of data, as shown in FIG. 6, the user equipment separately embeds a user equipment identity UEID and a buffer status report BSR in the transmitted data, and then sends, to the base station according to the control channel and the data channel that are of the first quantity of repetitions, the channel distribution information and a part of the transmitted data embedded with the user equipment identity UEID and the buffer status report BSR. In this case, the base station adjusts the first quantity of repetitions to a corresponding second quantity of repetitions according to the channel distribution information and the part of data embedded with the user equipment identity UEID and the buffer status report BSR, where the channel distribution information and the part of data are sent on the control channel and the data channel that are of the first quantities of repetitions; then, the base station sends scheduling information that includes the second quantity of repetitions to the user equipment, so that the user equipment adjusts an original quantity of repetitions to the second quantity of repetitions according to the scheduling information to perform data sending.

Figure 7:
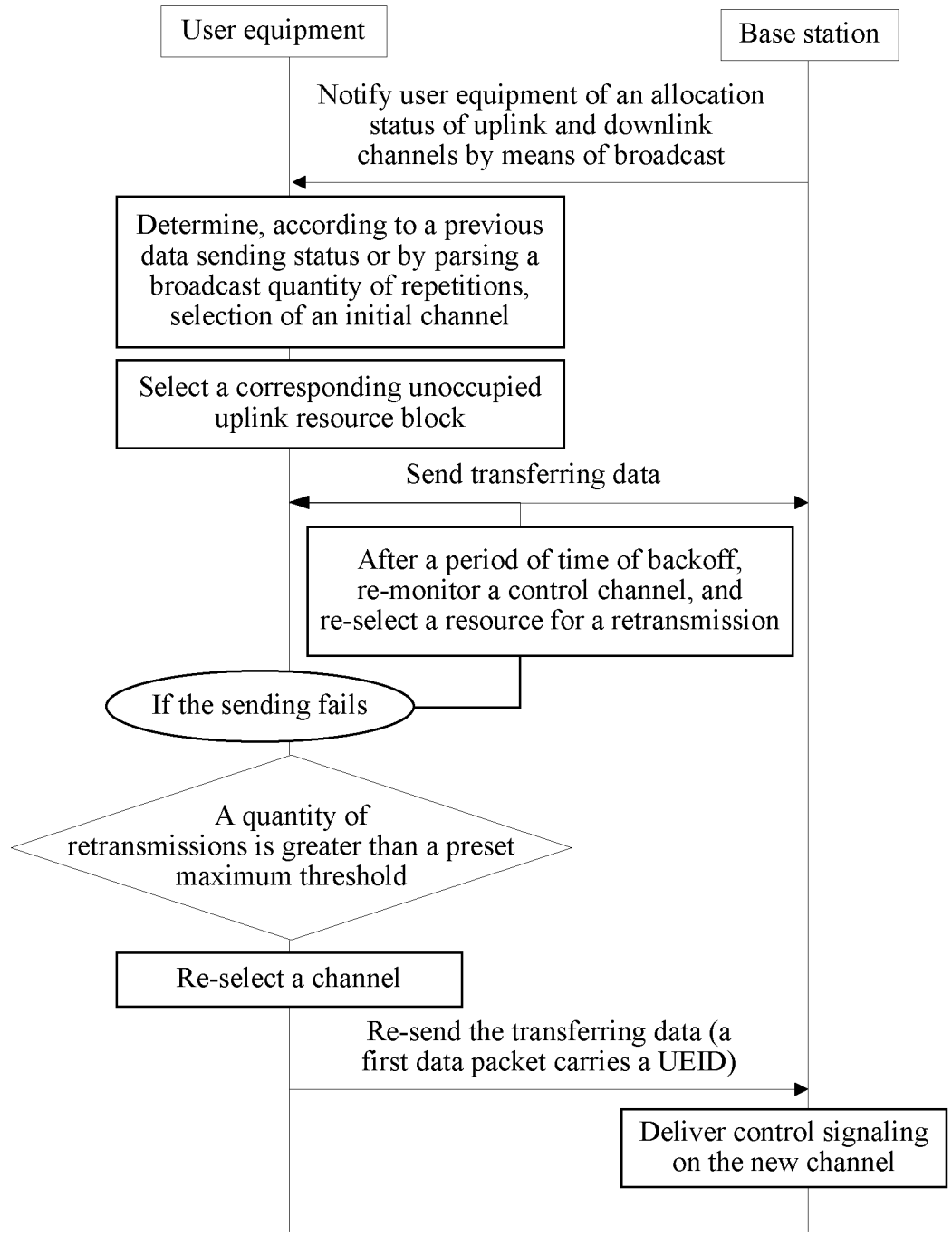
FIG. 7 is a specific schematic diagram 2 of performing data interaction by using a broadcast control bandwidth allocation and data transceiving method according to an embodiment of the present invention.

Further, as shown in FIG. 7, after the user equipment sends the data and the channel distribution information according to the control channel and the data channel that are of the first quantity of repetitions, if the user equipment fails to send the data according to the control channel and the data channel that are of the first quantity of repetitions, and a quantity of data retransmissions performed by the user equipment according to a random backoff probability in the broadcast information is greater than a preset maximum threshold, the base station acquires data that is on a control channel and a data channel that are of a third quantity of repetitions, then parses a user equipment identity UEID embedded in the data that is on the control channel and the data channel that are of the third quantity of repetitions, and finally acquires, according to the user equipment identity UEID, information about the control channel and the data channel that are of the third quantity of repetitions, so that the base station sends a control command on the control channel and the data channel that are of the third quantity of repetitions.

Figure 8:
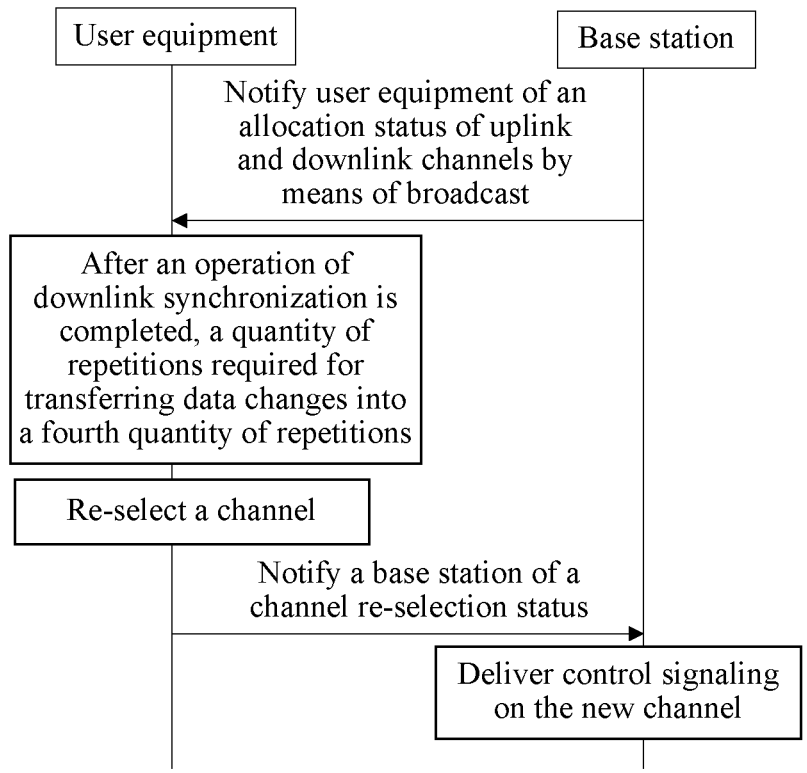
FIG. 8 is a specific schematic diagram 3 of performing data interaction by using a broadcast control bandwidth allocation and data transceiving method according to an embodiment of the present invention.

Further, as shown in FIG. 8, if a quantity of repetitions required for data changes into a fourth quantity of repetitions after the user equipment completes an operation of downlink synchronization, and the fourth quantity of repetitions is different from the first quantity of repetitions, the base station acquires a re-selection status that is sent by the user equipment and is of a control channel and a data channel that are of the corresponding fourth quantity of repetitions, and then completes sending of signaling to the user equipment on the control channel and the data channel that are of the fourth quantity of repetitions, where the operation of downlink synchronization is used as a synchronization operation of eliminating a time difference between the user equipment and the base station caused by sleeping of the user equipment.

Figure 9:
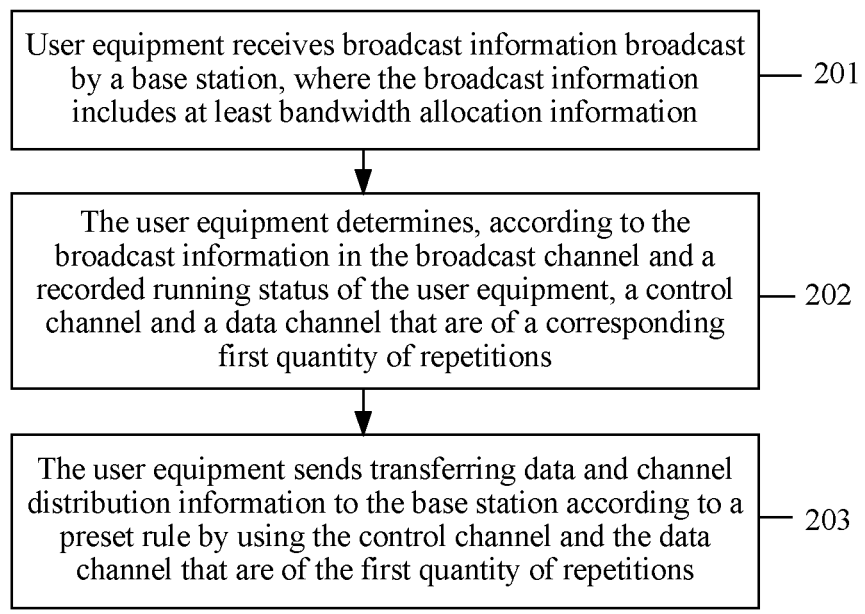
FIG. 9 is a schematic flowchart 2 of a broadcast control bandwidth allocation and data transceiving method according to an embodiment of the present invention.

An embodiment of the present invention provides a broadcast control bandwidth allocation and data transceiving method. As shown in FIG. 9, the method includes the following steps:

201. User equipment receives broadcast information broadcast by a base station, where the broadcast information includes at least bandwidth allocation information.

The bandwidth allocation information may include at least one or more types of the following information: preset quantities of data channels and control channels, preset bandwidth of each data channel and each control channel, preset quantities of repetitions corresponding to each data channel and each control channel, frequency channel number positions of uplink and downlink narrowband, and a position fixedly used as a time-frequency resource position of a random access channel RACH.

Further, the bandwidth and the quantities of data channels and control channels and the quantities of repetitions corresponding to each data channel and each control channel are obtained by the base station by performing preprocessing on a time-frequency resource of a channel according to a use status fed back by the user equipment. The frequency channel number positions of the uplink and downlink narrowband are used to indicate frequency band resources occupied by the uplink and downlink narrowband. The RACH (Random Access Channel, random access channel) is an uplink transmission channel, and is used to indicate a position of a resource that is used for competitive access; data receiving is always performed on the RACH within an entire cell, the RACH features a collision risk, and open loop power control is used.

Optionally, the broadcast information may further include one or more types of the following information: access control information, a cell ID, public land mobile network PLMN information, a system frame number, a system message change indication, random backoff time, and a random backoff probability.

The access control information is used to indicate a type of user equipment that is allowed for access or allowed to send data. The cell ID is physical identification information of a cell, and is used to distinguish different cells. The PLMN information is used to distinguish different operator networks, so as to perform access control. The system frame number is used to indicate a current running time point of a base station. The system message change indication is used to indicate whether a system message of user equipment changes; for example, the system message change indication may be implemented by using an indication similar to a Valuetag indication in a current LTE (Long Term Evolution, Long Term Evolution) system. The random backoff time is used to indicate sleep duration of user equipment after the user equipment fails to send data. The random backoff probability is used to indicate whether to perform a backoff operation, and a probability of performing the backoff operation.

202. The user equipment determines, according to the broadcast information in a broadcast channel and a recorded running status of the user equipment, a control channel and a data channel that are of a corresponding first quantity of repetitions.

During a process of data interaction that is between the base station and the user equipment and is before current channel selection, after the user equipment determines, according to the broadcast information in the broadcast channel and the recorded running status of the user equipment, the control channel and the data channel that are of the corresponding first quantity of repetitions, the user equipment records the first quantity of repetitions of the corresponding control channel and data channel that send data, and stores the first quantity of repetitions as historical data, so that when re-sending the data, the user equipment determines the control channel and the data channel that are of the corresponding first quantity of repetitions.

Specifically, after receiving the broadcast information broadcast by the base station, the user equipment parses the broadcast information. First, the user equipment determines whether the control channel and the data channel that are of the data and of the first quantity of repetitions are recorded. If the control channel and the data channel that are of the first quantity of repetitions are recorded, the user equipment sends data to the base station by re-using the control channel and the data channel that are of the first quantity of repetitions. If the control channel and the data channel that are of the data and of the first quantity of repetitions are not recorded, the user equipment performs information combining on the continuously received broadcast information, and then parses the combined broadcast information according to preset parsing code to determine the control channel and the data channel that are of the corresponding first quantity of repetitions.

In addition, if the user equipment is woken up from a sleep state, the user equipment performs an operation of downlink synchronization to determine a control channel and a data channel that are of a corresponding quantity of repetitions and is in a current situation.

Specifically, the user equipment performs the operation of downlink synchronization with the base station to eliminate a time difference between the user equipment and the base station caused by sleeping of the user equipment; then, the user equipment acquires a time for completing the operation of downlink synchronization; finally, the user equipment determines, according to the time for the operation of downlink synchronization and a preset relationship between a preset time for the operation of downlink synchronization and channel selection, a control channel and a data channel that are of a fourth quantity of repetitions. If the fourth quantity of repetitions is different from the first quantity of repetitions, the user equipment sends the data and the channel distribution information to the base station by using the control channel and the data channel that are of the fourth quantity of repetitions, so that the base station sends signaling to the user equipment on the re-selected control channel and data channel that are of the fourth quantity of repetitions.

For example, the user equipment is woken up thirty minutes later after entering the sleep state; in this case, the user equipment needs to determine a control channel and a data channel that are of a corresponding quantity of repetitions and are required in a current running status of the user equipment, so as to complete data interaction between the base station and the user equipment. First, the user equipment performs the operation of downlink synchronization with the base station to eliminate a thirty-minute time difference between the user equipment and the base station caused by sleeping of the user equipment; then, the user equipment acquires the time for completing the operation of downlink synchronization, for example, it takes thirty minutes to complete the operation of downlink synchronization. A corresponding relationship between the time for completing the operation of downlink synchronization and a control channel and a data channel that are of a corresponding quantity of repetitions is preset in a system of the user equipment, and the user equipment can determine, by only querying the corresponding relationship, the control channel and the data channel that are of the fourth quantity of repetitions and are currently required for completing data interaction between the base station and the user equipment. The user equipment determines whether the fourth quantity of repetitions is equal to the first quantity of repetitions, and if the fourth quantity of repetitions is different from the first quantity of repetitions, the user equipment sends the data and the channel distribution information to the base station according to the control channel and the data channel that are of the fourth quantity of repetitions.

203. The user equipment sends data and channel distribution information to the base station according to a preset rule by using the control channel and the data channel that are of the first quantity of repetitions.

Specifically, after the user equipment determines, according to the broadcast information in the broadcast channel and the recorded running status of the user equipment, the control channel and the data channel that are of the first quantity of repetitions, the user equipment sends the data and the channel distribution information to the base station according to the control channel and the data channel that are of the first quantity of repetitions. First, the user equipment determines whether the data can be completely sent within one frame. If the data can be completely sent within one frame, the user equipment embeds a user equipment identity UEID in the transmitted data, and then sends, to the base station according to the control channel and the data channel that are of the first quantity of repetitions, the channel distribution information and the data embedded with the user equipment identity UEID. If the data cannot be completely sent within one frame, the user equipment separately embeds a user equipment identity UEID and a buffer status report BSR in the transmitted data, and in this case, the user equipment sends, to the base station according to the control channel and the data channel that are of the first quantity of repetitions, the channel distribution information and a part of the transmitted data embedded with the user equipment identity UEID and the buffer status report BSR. After receiving the part of data embedded with the user equipment identity UEID and the buffer status report BSR, the base station parses the part of data, adjusts a second quantity of repetitions that is used when data interaction is performed between the base station and the user equipment, and sends scheduling information of the adjusted second quantity of repetitions to the user equipment. After acquiring the scheduling information of the base station, the user equipment sends a remaining part of data to the base station according to the second quantity of repetitions in the scheduling information.

According to the broadcast control bandwidth allocation and data transceiving method provided in this embodiment of the present invention, location information and channel distribution information that are of each user equipment are acquired, bandwidth and quantities of data channels and control channels and quantities of repetitions corresponding to each data channel and each control channel are determined, and then bandwidth allocation information is updated according to the bandwidth and the quantities of data channels and control channels and the quantities of repetitions corresponding to each data channel and each control channel, where the bandwidth allocation information further includes frequency channel number positions of uplink and downlink narrowband and a position fixedly used as a time-frequency resource position of a random access channel RACH; then, broadcast information is sent to the user equipment, where the broadcast information in a broadcast channel includes at least the bandwidth allocation information, so that each user equipment determines, according to the bandwidth allocation information, a control channel and a data channel that are of a corresponding quantity of repetitions and are required for sending data. In the solution, preprocessing is performed on a time-frequency resource of a channel, and effective dynamic division is performed on the time-frequency resource of the channel; then, a base station writes, into bandwidth allocation information in broadcast information, preset bandwidth and quantities of each data channel and each control channel and preset quantities of repetitions corresponding to each data channel and each control channel. After receiving the broadcast information, user equipment accordingly obtains a scheme for performing effective dynamic division on the time-frequency resource of the channel, that is, the bandwidth and the quantities of each data channel and each control channel and the quantities of repetitions corresponding to each data channel and each control channel; the user equipment parses parameters in the broadcast information, so as to complete a corresponding channel selection operation, which implements semi-static adjustment performed by the base station on the user equipment, and optimizes a process of performing data interaction between the base station and the user equipment.

Embodiment 2

Figure 10A:
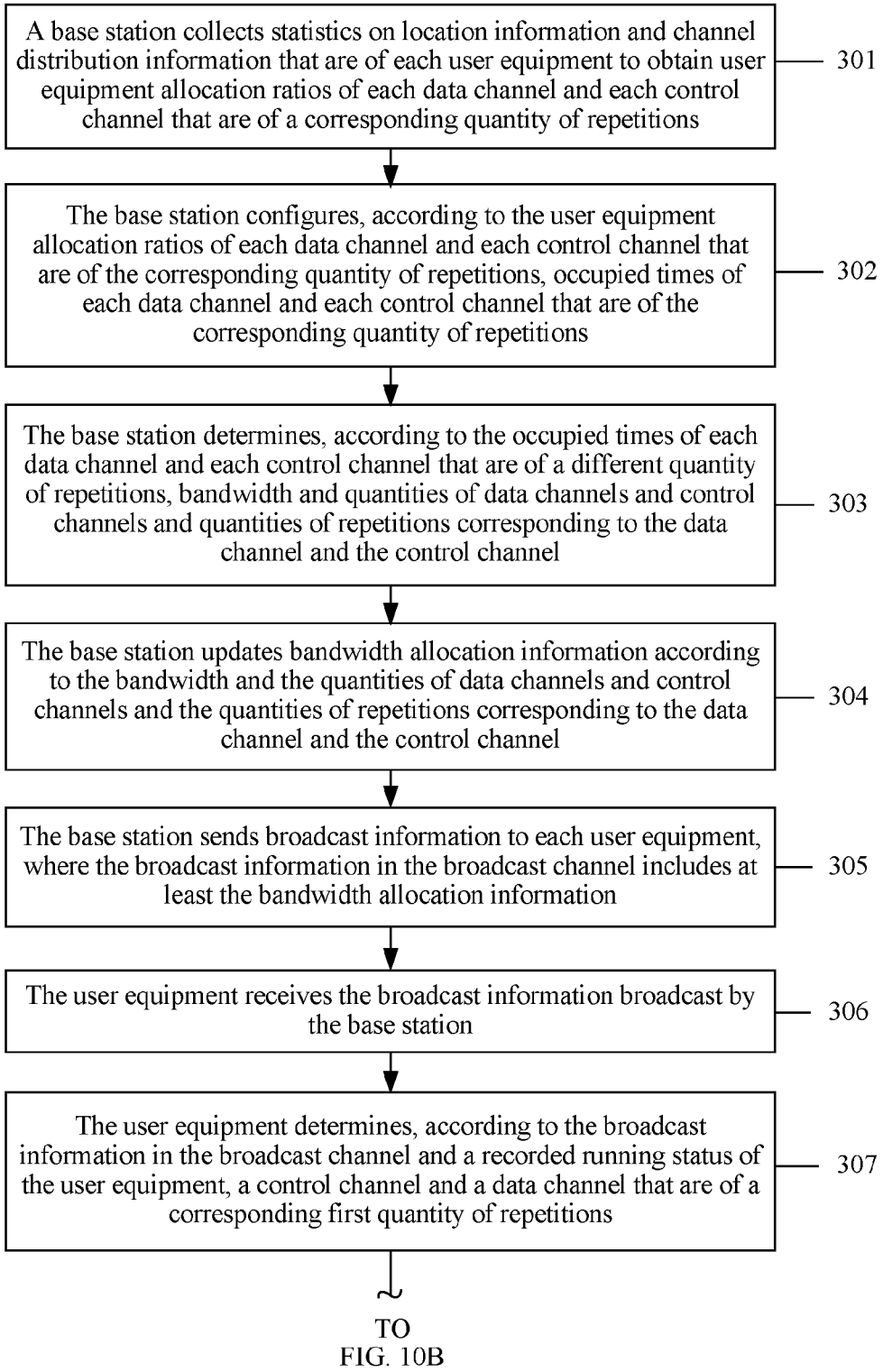
FIG. 10A and FIG. 10B are a schematic flowchart 3 of a broadcast control bandwidth allocation and data transceiving method according to an embodiment of the present invention.
Figure 10B:
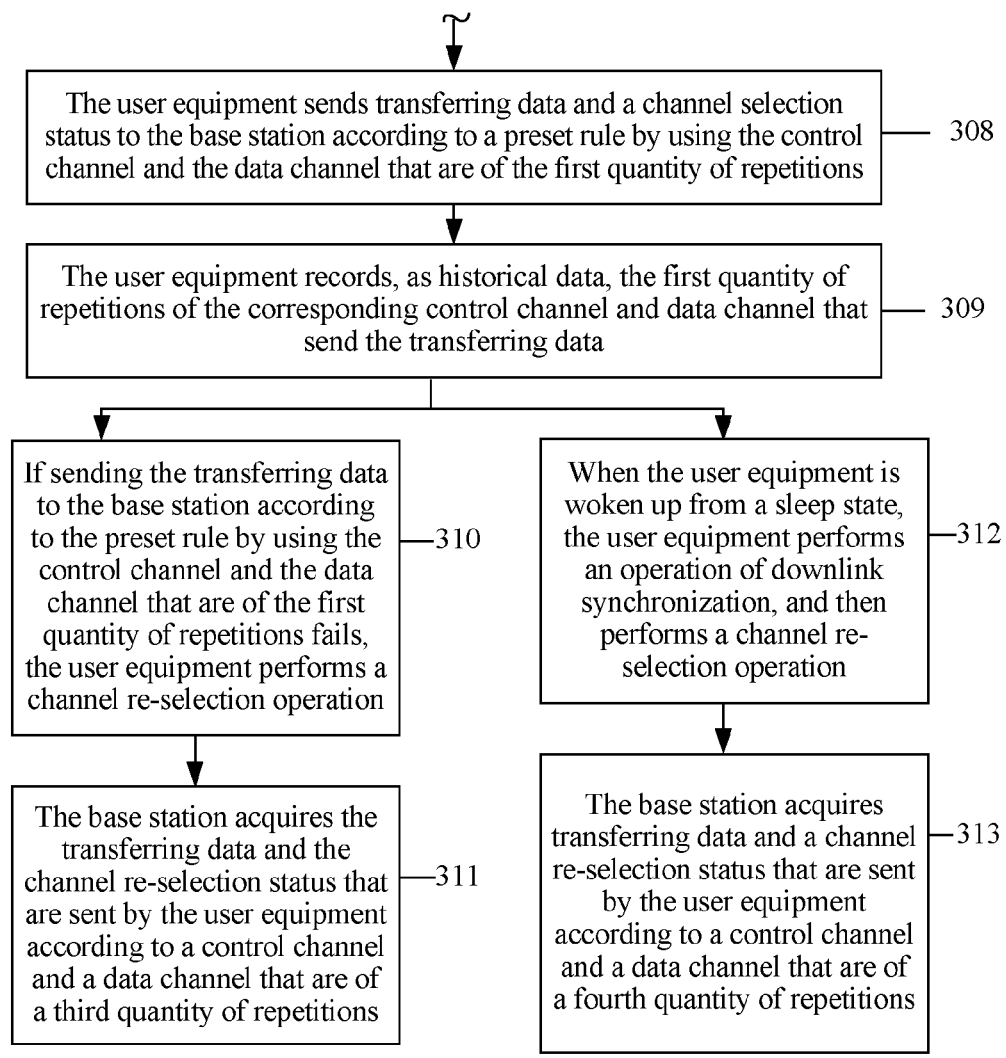

An embodiment of the present invention provides a broadcast control bandwidth allocation and data transceiving method. As shown in FIG. 10A and FIG. 10B, the method includes the following steps:

301. A base station collects statistics on location information and channel distribution information that are of each user equipment to obtain user equipment allocation ratios of each data channel and each control channel that are of a corresponding quantity of repetitions.

When data interaction is performed between the base station and the user equipment, areas covered by the base station are divided into different levels according to a quantity of repetitions required for sending data. As shown in FIG. 2, an area A is a common coverage area in which data interaction between the base station and the user equipment can be completed without performing spread spectrum (referred to as 1X); an area B/C is an extended coverage area in which data interaction between the base station and the user equipment needs to be completed in a manner of spread spectrum, that is, retransmissions (for example, 8-fold repetitions are referred to as 8X, 64-fold repetitions are referred to as 64X, or repetitions of another multiple appear). When user equipments are located in areas of different coverage levels, and a terminal that needs a larger quantity of repetitions and a terminal that needs a smaller quantity of repetitions contend for sending data, it is difficult for the former to obtain a resource by means of contention.

Specifically, the base station needs to collect statistics on selection statuses of a data channel and a control channel of each user equipment to obtain the user equipment allocation ratios of each data channel and each control channel that are of a different quantity of repetitions.

Exemplarily, because each time the base station and the user equipment perform data interaction, the user equipment sends, to the base station, channel distribution information of that is used to send data, the base station performs statistic collection according to the information sent by the user equipment to obtain the user equipment allocation ratios of each data channel and each control channel that are of the different quantity of repetitions. For example, after performing statistics collection, the base station learns that there are 10 user equipments that use a 1X channel, 20 user equipments that use an 8X channel, and 20 user equipments that use a 64X channel; then, the user equipment allocation ratios of data channels and control channels that are of the different quantity of repetitions are that the 1X channels occupy 20%, the 8X channels occupy 40%, and the 64X channels occupy 40%.

302. The base station configures, according to the user equipment allocation ratios of each data channel and each control channel that are of the corresponding quantity of repetitions, occupied time of each data channel and each control channel that are of the corresponding quantity of repetitions.

Figure 4:
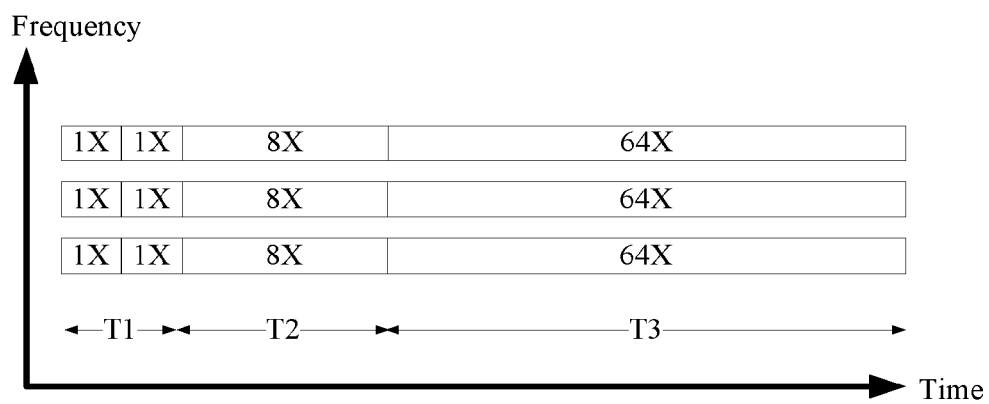
FIG. 4 is a schematic diagram of division of a time-frequency resource of a channel by time according to an embodiment of the present invention.

Specifically, as shown in FIG. 4, the base station configures, according to the user equipment allocation ratios of each data channel and each control channel that are of the different quantity of repetitions, occupied time of each data channel and each control channel that are of the different quantity of repetitions. For example, an occupied time allocated to a 1X channel is T1, an occupied time allocated to an 8X channel is T2, and an occupied time allocated to a 64X channel is T3, where values of T1, T2, and T3 are obtained according to the user equipment allocation ratios of each data channel and each control channel that are of the different quantity of repetitions.

Exemplarily, after performing statistics collection, the base station learns that there are 10 user equipments that use a 1X channel, 20 user equipments that use an 8X channel, and 20 user equipments that use a 64X channel; then, the user equipment allocation ratios of data channels and control channels that are of the different quantity of repetitions are that the 1X channels occupy 20%, the 8X channels occupy 40%, and the 64X channels occupy 40%. The base station configures, according to the allocation ratios, occupied time of each data channel and each control channel that are of the different quantity of repetitions, where an occupied time allocated to the 1X channel is 4.8 hours, an occupied time allocated to the 8X channel is 9.6 hours, and an occupied time allocated to the 64X channel is 9.6 hours.

Figure 5:
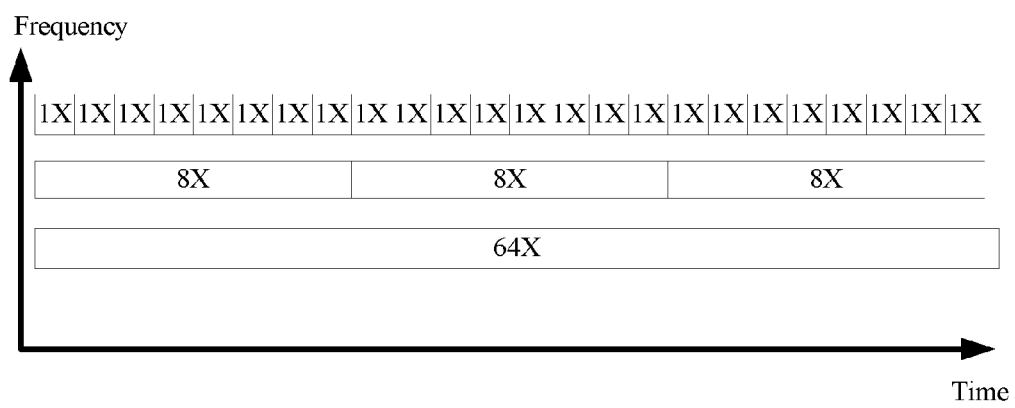
FIG. 5 is a schematic diagram of division of a time-frequency resource of a channel by frequency according to an embodiment of the present invention.

In addition, as shown in FIG. 5, the base station may further divide a time-frequency resource of a channel according to a value range of a frequency, that is, the base station configures, according to the user equipment allocation ratios of each data channel and each control channel that are of the different quantity of repetitions, occupied frequencies of each data channel and each control channel that are of the different quantity of repetitions. For example, an occupied frequency allocated to the 1X channel is X, an occupied frequency allocated to the 8X channel is Y, and an occupied frequency allocated to the 64X channel is Z, where values of X, Y, and Z are obtained according to the user equipment allocation ratios of each data channel and each control channel that are of the different quantity of repetitions.

Further, the base station may further divide the time-frequency resource of the channel according to a method of a combination of a time and a frequency, that is, the base station configures, according to the user equipment allocation ratios of each data channel and each control channel that are of the different quantity of repetitions, occupied time frequencies of each data channel and each control channel that are of the different quantity of repetitions.

303. The base station determines, according to the occupied time of each data channel and each control channel that are of a different quantity of repetitions, bandwidth and quantities of data channels and control channels and quantities of repetitions corresponding to the data channel and the control channel.

Specifically, after configuring, according to the user equipment allocation ratios of each data channel and each control channel that are of the different quantity of repetitions, the occupied time of each data channel and each control channel that are of the different quantity of repetitions, the base station determines bandwidth and quantities of each data channel and each control channel and quantities of repetitions corresponding to each data channel and each control channel.

Exemplarily, after performing statistics collection, the user equipment learns that there are 10 user equipments that use a 1X channel, 20 user equipments that use an 8X channel, and 20 user equipments that use a 64X channel; then, the user equipment allocation ratios of data channels and control channels that are of the different quantity of repetitions are that the 1X channels occupy 20%, the 8X channels occupy 40%, and the 64X channels occupy 40%. The base station configures, according to the allocation ratios, the occupied time of each data channel and each control channel that are of the different quantity of repetitions, where an occupied time allocated to the 1X channel is 4.8 hours, an occupied time allocated to the 8X channel is 9.6 hours, and an occupied time allocated to the 64X channel is 9.6 hours. Then, the base station determines the bandwidth and the quantities of each data channel and each control channel and the quantities of repetitions corresponding to each data channel and each control channel.

It should be noted that examples in steps 301 to 303 are merely exemplary, and a calculating method similar to the examples shall also fall within the protection scope of the solution.

304. The base station updates bandwidth allocation information according to the bandwidth and the quantities of data channels and control channels and the quantities of repetitions corresponding to the data channel and the control channel.

The bandwidth allocation information further includes frequency channel number positions of uplink and downlink narrowband and a position fixedly used as a time-frequency resource position of a random access channel RACH.

The bandwidth and the quantities of each data channel and each control channel and the quantities of repetitions corresponding to each data channel and each control channel are obtained by the base station by performing preprocessing on a time-frequency resource of a channel according to a use status fed back by the user equipment. The frequency channel number positions of the uplink and downlink narrowband are used to indicate frequency band resources occupied by the uplink and downlink narrowband. The RACH is an uplink transmission channel, and is used to indicate a position of a resource that is used for competitive access; data receiving is always performed on the RACH within an entire cell, and open loop power control is used.

Specifically, because of a change of a running status of the user equipment, the base station performs preprocessing on the time-frequency resource of the channel according to the use status fed back by the user equipment to obtain the bandwidth and the quantities of each data channel and each control channel, and re-writes this information into the bandwidth allocation information, which overwrites the original bandwidth allocation information. For example, after preprocessing is performed on the time-frequency resource of the channel according to the use status fed back by the user equipment, the base station determines that a current time-frequency resource allocation status is as follows: One 1X control channel and one 1X data channel, eight 8X control channels and eight 8X data channels, and sixteen 16X control channels and sixteen 16X data channels. Then, the base station writes this allocation information into the bandwidth allocation information, which overwrites the original bandwidth allocation information.

305. The base station sends broadcast information to each user equipment, where the broadcast information in a broadcast channel includes at least the bandwidth allocation information.

Specifically, after the base station updates the bandwidth allocation information, the base station continuously broadcasts the broadcast information to the user equipment by means of broadcast, so that the user equipment receives the broadcast information, and determines, according to the broadcast information in the broadcast channel and a recorded running status of the user equipment, a corresponding data channel and control channel that are of first quantities of repetitions.

Further, in addition to the bandwidth and the quantities of each data channel and each control channel that are obtained by the base station by performing preprocessing on the time-frequency resource of the channel according to the use status fed back by the user equipment, the broadcast information further includes: access control information, a cell ID, public land mobile network PLMN information, a system frame number, a system message change indication, random backoff time, and a random backoff probability.

The access control information is used to indicate a type of user equipment that is allowed for access or allowed to send data. The cell ID is physical identification information of a cell, and is used to distinguish different cells. The PLMN information is used to distinguish different operator networks, so as to perform access control. The system frame number is used to indicate a current running time point of a base station. The system message change indication is used to indicate whether a system message of user equipment changes; for example, the system message change indication may be implemented by using an indication similar to a Valuetag indication in a current LTE (Long Term Evolution, Long Term Evolution) system. The random backoff time is used to indicate sleep duration of user equipment after the user equipment fails to send data. The random backoff probability is used to indicate whether to perform a backoff operation, and a probability of performing the backoff operation.

306. The user equipment receives the broadcast information broadcast by the base station.

Specifically, after the base station sends the broadcast information to the user equipment, where the broadcast information in the broadcast channel includes at least the bandwidth allocation information, the user equipment receives the broadcast information broadcast by the base station.

The broadcast information is continuously sent by the base station. When receiving the broadcast information, the user equipment each time receives broadcast information that is at a fixed time, then combines and parses the broadcast information received at each time, and finally determines the control channel and the data channel that are of the corresponding first quantities of repetitions, so that the base station and the user equipment complete data interaction.

307. The user equipment determines, according to the broadcast information in the broadcast channel and a recorded running status of the user equipment, a control channel and a data channel that are of a corresponding first quantity of repetitions.

The recorded running status of the user equipment is that during a process of data interaction that is between the base station and the user equipment and is before current channel selection, after the user equipment determines, according to the broadcast information in the broadcast channel and the recorded running status of the user equipment, the control channel and the data channel that are of the corresponding first quantity of repetitions, the user equipment records the first quantity of repetitions of the corresponding control channel and data channel that send the data, and stores the first quantity of repetitions as historical data, so that when re-sending the data, the user equipment determines the control channel and the data channel that are of the corresponding first quantity of repetitions.

Specifically, after receiving the broadcast information broadcast by the base station, the user equipment parses the broadcast information. First, the user equipment determines whether the control channel and the data channel that are of the data and of the first quantity of repetitions are recorded. If the control channel and the data channel that are of the data and of the first quantity of repetitions are recorded, the user equipment invokes the historical data to send data to the base station by re-using the control channel and the data channel that are of the first quantity of repetitions. If the control channel and the data channel that are of the data and of the first quantity of repetitions are not recorded, the user equipment performs information combining on the continuously received broadcast information, and then parses the combined broadcast information according to preset parsing code to determine the control channel and the data channel that are of the corresponding first quantity of repetitions.

308. The user equipment sends data and the channel distribution information to the base station according to a preset rule by using the control channel and the data channel that are of the first quantity of repetitions.

Specifically, after the user equipment determines, according to the broadcast information in the broadcast channel and the recorded running status of the user equipment, the control channel and the data channel that are of the first quantity of repetitions, the user equipment sends the data and the channel distribution information to the base station according to the control channel and the data channel that are of the first quantity of repetitions. First, the user equipment determines that the data can be completely sent within one frame. If the data can be completely sent within one frame, the user equipment embeds a user equipment identity UEID in the transmitted data, and then sends, to the base station according to the control channel and the data channel that are of the first quantity of repetitions, the channel distribution information and the data embedded with the user equipment identity UEID. If the data cannot be completely sent within one frame, the user equipment separately embeds a user equipment identity UEID and a buffer status report BSR in the transmitted data, and in this case, the user equipment sends, to the base station according to the control channel and the data channel that are of the first quantity of repetitions, the channel distribution information and a part of the transmitted data embedded with the user equipment identity UEID and the buffer status report BSR. After receiving the part of data embedded with the user equipment identity UEID and the buffer status report BSR, the base station parses the part of data, adjusts a second quantity of repetitions that is used when data interaction is performed between the base station and the user equipment, and sends scheduling information of the adjusted second quantity of repetitions to the user equipment. After acquiring the scheduling information of the base station, the user equipment sends a remaining part of data to the base station according to the second quantity of repetitions in the scheduling information.

Further, after the user equipment sends the data and the channel distribution information to the base station according to the preset rule by using the control channel and the data channel that are of the first quantities of repetitions, if sending the data to the base station according to the preset rule by using the control channel and the data channel that are of the first quantities of repetitions fails, the user equipment performs a preset time of backoff according to random backoff time in the broadcast information, then monitors the broadcast information in the broadcast channel, and finally re-sends the data to the base station according to a random backoff probability in the broadcast information.

309. The user equipment records, as historical data, the first quantity of repetitions of the corresponding control channel and data channel that send the data.

Specifically, after determining, according to the broadcast information in the broadcast channel and the recorded running status of the user equipment, the control channel and the data channel that are of the corresponding first quantities of repetitions, the user equipment records, as historical data, the first quantities of repetitions of the corresponding control channel and data channel that send the data, so that when re-sending the data, the user equipment invokes the historical data to determine the control channel and the data channel that are of the corresponding first quantities of repetitions.

Exemplarily, a particular user equipment determines, according to the broadcast information in the broadcast channel and a recorded running status of the user equipment, that the control channel and the data channel that are of the corresponding first quantities of repetitions are an 8X control channel and a 64X data channel; in this case, the user equipment stores, as historical data, the current control channel and data channel that are of the first quantities of repetitions, that is, the 8X control channel and the 64X data channel. When re-sending the data, the user equipment directly invokes the historical data to determine the control channel and the data channel that are of the corresponding first quantities of repetitions to perform data interaction between the base station and the user equipment.

310. If sending the data to the base station according to the preset rule by using the control channel and the data channel that are of the first quantity of repetitions fails, the user equipment performs a channel re-selection operation.

Specifically, after the user equipment sends the data and the channel distribution information to the base station according to the preset rule by using the control channel and the data channel that are of the first quantities of repetitions, if sending the data to the base station according to the preset rule by using the control channel and the data channel that are of the first quantities of repetitions fails, the user equipment performs a preset time of backoff according to random backoff time in the broadcast information, then monitors the broadcast information in the broadcast channel, and finally re-sends the data to the base station according to a random backoff probability in the broadcast information.

In this case, if a quantity of data retransmissions performed by the user equipment according to the random backoff probability in the broadcast information is greater than a preset maximum threshold, the user equipment re-selects, according to the current first quantity of repetitions of the control channel and the data channel, a control channel and a data channel that are of a third quantity of repetitions that is greater than the first quantity of repetitions; then, the user equipment sends the data and the channel distribution information to the base station according to the control channel and the data channel that are of the third quantity of repetitions, so that the base station sends signaling to the user equipment on the re-selected control channel and data channel that are of the third quantity of repetitions, where the data is embedded with a user equipment identity UEID.

311. The base station acquires data and channel distribution information that are sent by the user equipment according to a control channel and a data channel that are of a third quantity of repetitions.

Specifically, the base station acquires the channel distribution information and the data embedded with the user equipment identity UEID, where the channel distribution information and the data are sent by the user equipment according to the control channel and the data channel that are of the third quantity of repetitions, then parses the user equipment identity UEID embedded in the data that is on the control channel and the data channel that are of the third quantity of repetitions, and finally acquires, according to the user equipment identity UEID, information about the control channel and the data channel that are of the third quantity of repetitions, so that the base station sends a control command on the control channel and the data channel that are of the third quantity of repetitions.

312. When the user equipment is woken up from a sleep state, the user equipment performs an operation of downlink synchronization, and then performs a channel re-selection operation.

Specifically, when the user equipment is woken up from the sleep state, the user equipment performs the operation of downlink synchronization with the base station, so as to eliminate a time difference between the user equipment and the base station caused by sleeping of the user equipment, and acquires a time for completing the operation of downlink synchronization; then, the user equipment determines, according to the time for the operation of downlink synchronization and a preset relationship between a preset time for the operation of downlink synchronization and channel selection, a control channel and a data channel that are of a fourth quantity of repetitions.

Further, if a quantity of repetitions required for data changes into a fourth quantity of repetitions after the user equipment completes the operation of downlink synchronization, and the fourth quantity of repetitions is different from the first quantity of repetitions, the base station acquires a re-selection status that is sent by the user equipment and is of the control channel and the data channel that are of the corresponding fourth quantity of repetitions, and then completes sending of signaling to the user equipment on the control channel and the data channel that are of the fourth quantity of repetitions, where the operation of downlink synchronization is used as a synchronization operation of eliminating the time difference between the user equipment and the base station caused by sleeping of the user equipment.

313. The base station acquires data and channel distribution information that are sent by the user equipment according to a control channel and a data channel that are of a fourth quantity of repetitions.

Specifically, when the user equipment is woken up from the sleep state, the user equipment performs the operation of downlink synchronization, and then performs the channel re-selection operation. The user equipment sends the data to the base station according to the determined control channel and data channel that are of the fourth quantities of repetitions, and the base station accordingly acquires the re-selection status that is sent by the user equipment and is of the control channel and the data channel that are of the fourth quantities of repetitions, and then completes sending of signaling to the user equipment on the control channel and the data channel that are of the fourth quantity of repetitions, where the operation of downlink synchronization is used as a synchronization operation of eliminating the time difference between the user equipment and the base station caused by sleeping of the user equipment.

It should be noted that there is no time sequence between steps 312 to 313 and steps 301 to 311, that is, steps 312 to 313 may be completed before or after steps 301 to 311, or may be completed at any moment during execution of steps 301 to 311.

According to the broadcast control bandwidth allocation and data transceiving method provided in this embodiment of the present invention, location information and channel distribution information that are of each user equipment are acquired, bandwidth and quantities of data channels and control channels and quantities of repetitions corresponding to each data channel and each control channel are determined, and then bandwidth allocation information is updated according to the bandwidth and the quantities of data channels and control channels and the quantities of repetitions corresponding to each data channel and each control channel, where the bandwidth allocation information further includes frequency channel number positions of uplink and downlink narrowband and a position fixedly used as a time-frequency resource position of a random access channel RACH; then, broadcast information is sent to the user equipment, where the broadcast information in a broadcast channel includes at least the bandwidth allocation information, so that each user equipment determines, according to the bandwidth allocation information, a control channel and a data channel that are of a corresponding quantity of repetitions and are required for sending data. In the solution, preprocessing is performed on a time-frequency resource of a channel according to a use status fed back by user equipment, and effective dynamic division is performed on the time-frequency resource of the channel, so as to change a conventional common mode of a channel into a multiplexing mode in which time division or frequency division or time-frequency division is performed on a channel according to a real-time use status of the user equipment, which greatly improves utilization efficiency of the original channel, thereby maximizing utilization of the time-frequency resource in a process of performing data interaction between a base station and the user equipment, and further improving stability and efficiency in a data transmission process.

Embodiment 3

Figure 11:
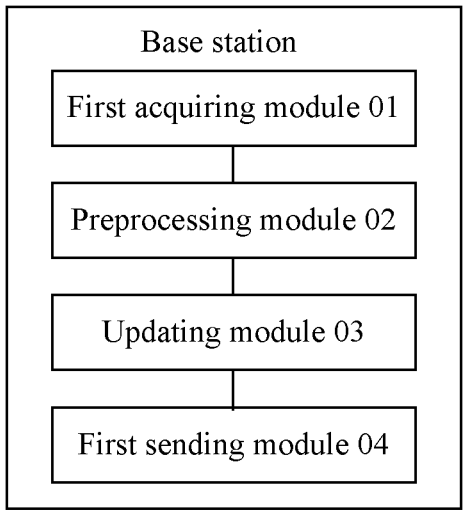
FIG. 11 is a schematic structural diagram 1 of a base station according to an embodiment of the present invention.

An embodiment of the present invention provides a base station. As shown in FIG. 11, the base station includes:

a first acquiring module 01, configured to acquire location information and channel distribution information that are of current user equipment, where the location information of the current user equipment is used to indicate location coordinates of the current user equipment, and the channel distribution information is used to indicate information about a channel used by the current user equipment and a quantity of repetitions of using the channel;

a preprocessing module 02, configured to determine, according to the location information and the channel distribution information that are of each user equipment, bandwidth and quantities of data channels and control channels and quantities of repetitions corresponding to the data channel and the control channel;

an updating module 03, configured to update bandwidth allocation information according to the bandwidth and the quantities of data channels and control channels and the quantities of repetitions corresponding to the data channel and the control channel, where the bandwidth allocation information is used to indicate time-frequency positions of and the quantities of repetitions of the control channel and the data channel; and a first sending module 04, configured to send broadcast information to each user equipment by using a broadcast channel, where the broadcast information includes at least the bandwidth allocation information, so that each user equipment determines, according to the bandwidth allocation information, a control channel and a data channel that are of a corresponding quantity of repetitions and are required for sending data, and then each user equipment chooses to receive and send data on the corresponding control channel and data channel.

Figure 12:
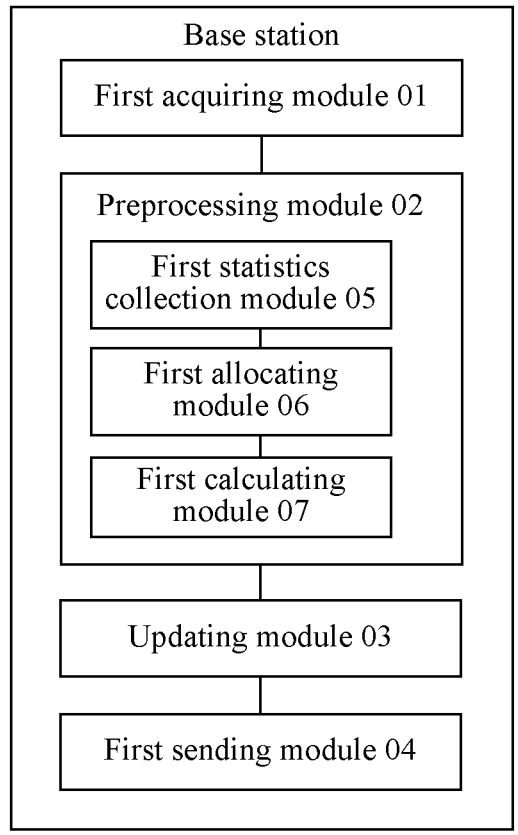
FIG. 12 is a schematic structural diagram 2 of a base station according to an embodiment of the present invention.

Further, as shown in FIG. 12, the preprocessing module 02 includes:

a first statistics collection module 05, configured to collect statistics on the location information and the channel distribution information that are of each user equipment to obtain user equipment allocation ratios of each data channel and each control channel that are of a corresponding quantity of repetitions;

a first allocating module 06, configured to configure, according to the user equipment allocation ratios of each data channel and each control channel that are of the corresponding quantity of repetitions, occupied time of each data channel and each control channel that are of the corresponding quantity of repetitions; and a first calculating module 07, configured to determine, according to the occupied time of each data channel and each control channel that are of a different quantity of repetitions, the bandwidth and the quantities of data channels and control channels and the quantities of repetitions corresponding to the data channel and the control channel.

Figure 13:
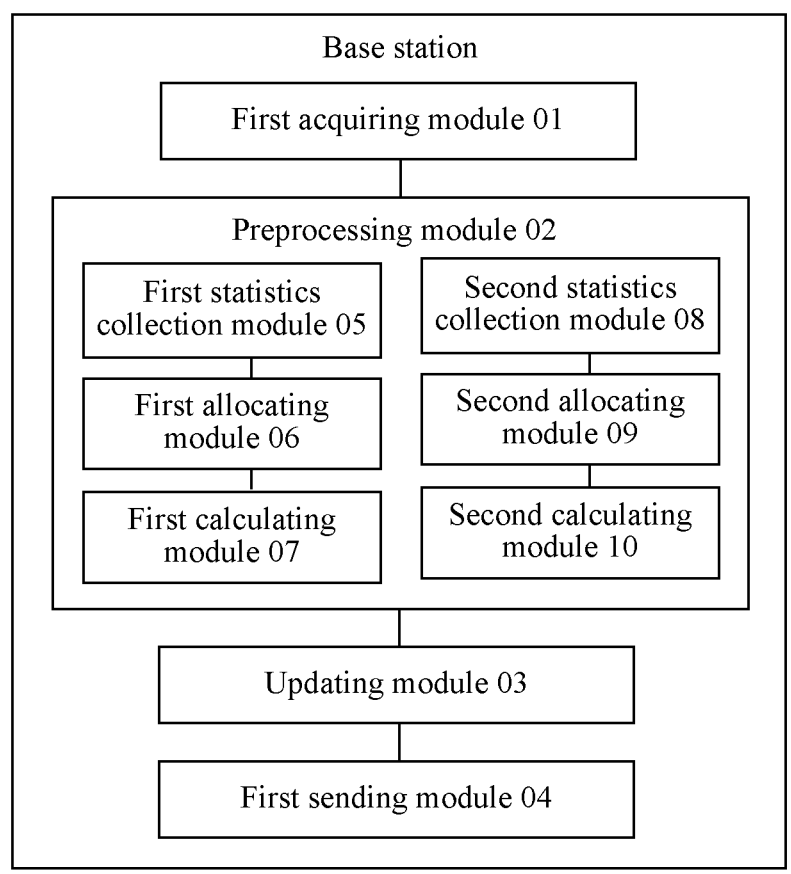
FIG. 13 is a schematic structural diagram 3 of a base station according to an embodiment of the present invention.

Further, as shown in FIG. 13, the preprocessing module 02 further includes:

a second statistics collection module 08, configured to collect statistics on the location information and the channel distribution information that are of each user equipment to obtain user equipment allocation ratios of each data channel and each control channel that are of a corresponding quantity of repetitions;

a second allocating module 09, configured to configure, according to the user equipment allocation ratios of each data channel and each control channel that are of the corresponding quantity of repetitions, occupied frequencies and/or occupied time frequencies of each data channel and each control channel that are of the corresponding quantity of repetitions; and a second calculating module 10, configured to determine, according to the occupied frequencies and/or the occupied time frequencies of each data channel and each control channel that are of a different quantity of repetitions, the bandwidth and the quantities of data channels and control channels and the quantities of repetitions corresponding to the data channel and the control channel.

Further, the bandwidth allocation information further includes frequency channel number positions of uplink and downlink narrowband and a position fixedly used as a time-frequency resource position of a random access channel RACH; where:

the frequency channel number positions of the uplink and downlink narrowband are used to indicate frequency band resources occupied by the uplink and downlink narrowband; and the time-frequency resource position of the random access channel RACH is used to indicate a position of a resource that is used for competitive access.

Further, the broadcast information further includes: access control information, a cell ID, public land mobile network PLMN information, a system frame number, a system message change indication, random backoff time, and a random backoff probability.

Figure 14:
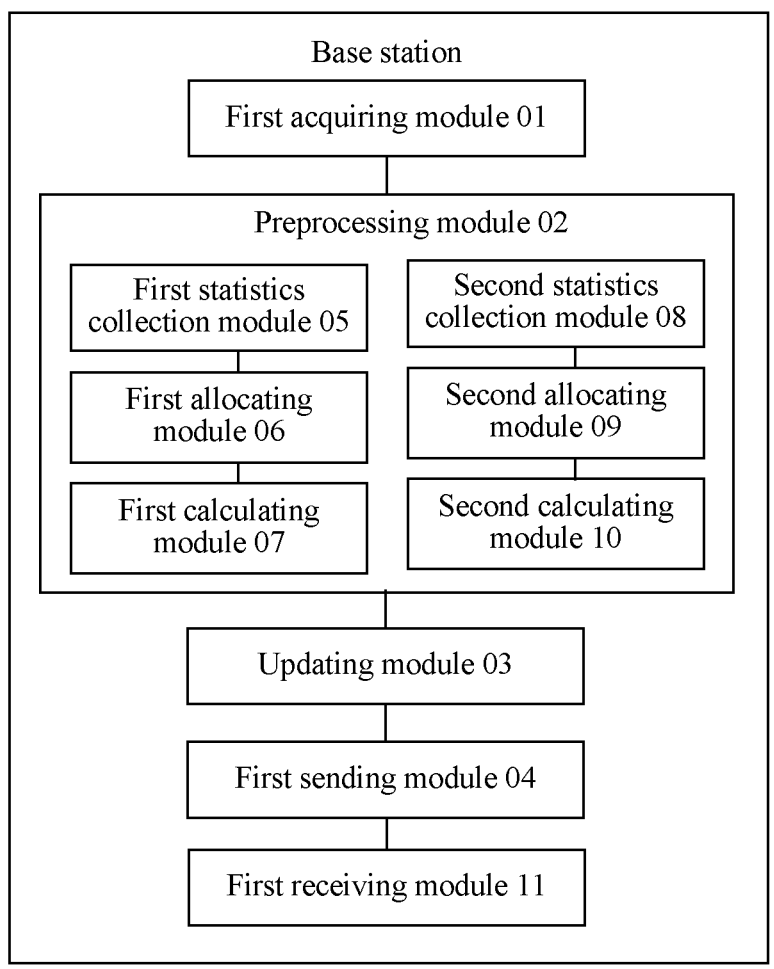
FIG. 14 is a schematic structural diagram 4 of a base station according to an embodiment of the present invention.

Further, as shown in FIG. 14, the base station further includes:

a first receiving module 11, configured to receive the channel distribution information and data embedded with a user equipment identity UEID, where the channel distribution information and the data are sent by the user equipment according to a control channel and a data channel that are of a corresponding quantity of repetitions; or receive the channel distribution information and a part of data embedded with a user equipment identity UEID and a buffer status report BSR, where the channel distribution information and the part of data are sent by the user equipment according to a control channel and a data channel that are of a corresponding quantity of repetitions.

Figure 15:
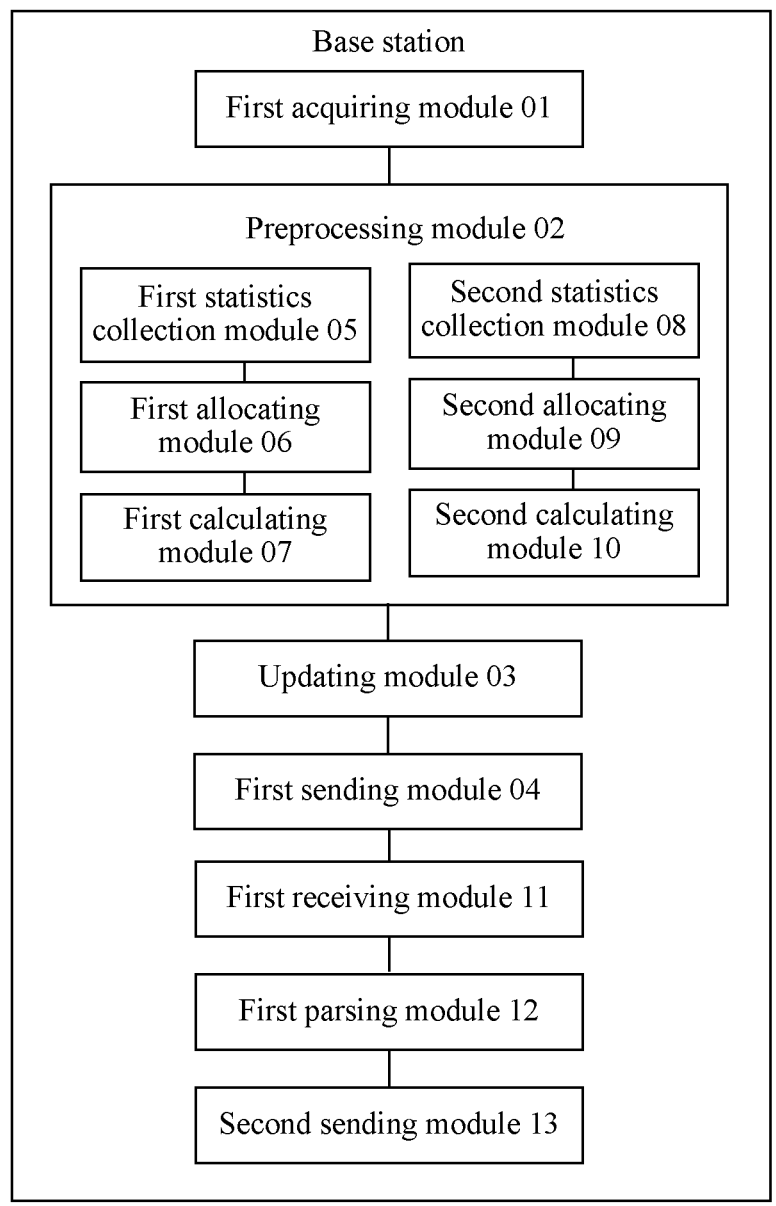
FIG. 15 is a schematic structural diagram 5 of a base station according to an embodiment of the present invention.

Further, as shown in FIG. 15, the base station further includes:

a first parsing module 12, configured to parse the channel distribution information and the part of data embedded with the user equipment identity UEID and the buffer status report BSR to obtain a parsed second quantity of repetitions, where the channel distribution information and the part of data are sent on the control channel and the data channel that are of the corresponding quantity of repetitions; and a second sending module 13, configured to send scheduling information that includes the second quantity of repetitions to the user equipment, so that the user equipment adjusts an original quantity of repetitions to the second quantity of repetitions according to the scheduling information to perform data sending.

Figure 16:
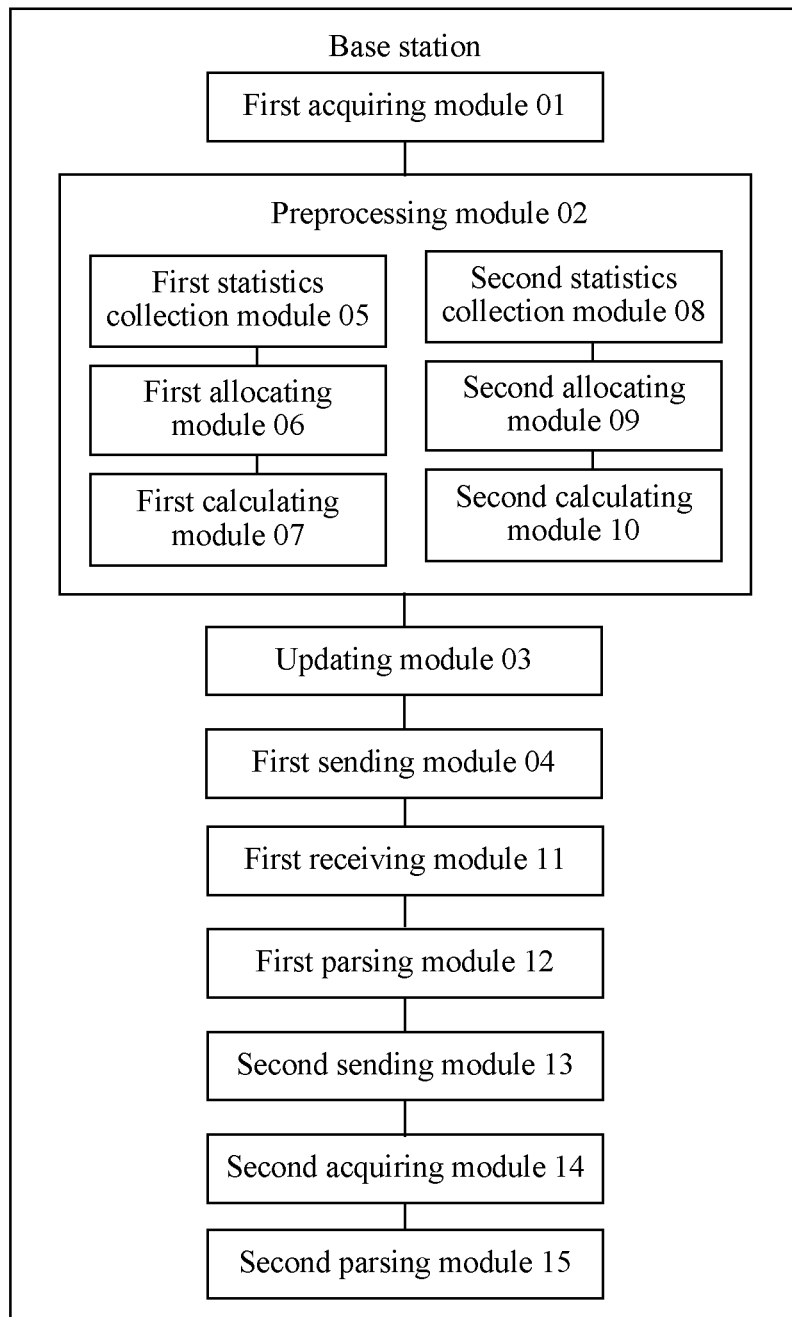
FIG. 16 is a schematic structural diagram 6 of a base station according to an embodiment of the present invention.

Further, as shown in FIG. 16, the base station further includes:

a second acquiring module 14, configured to: if the user equipment fails to send the data according to the control channel and the data channel that are of the corresponding quantity of repetitions, and a quantity of data retransmissions performed by the user equipment according to a random backoff probability in the broadcast information is greater than a preset maximum threshold, acquire data that is sent by the user equipment on a control channel and a data channel that are of a corresponding third quantity of repetitions; and a second parsing module 15, configured to parse a user equipment identity UEID embedded in the data that is on the control channel and the data channel that are of the third quantity of repetitions, so that the base station sends a control command on the control channel and the data channel that are of the third quantity of repetitions.

Figure 17:
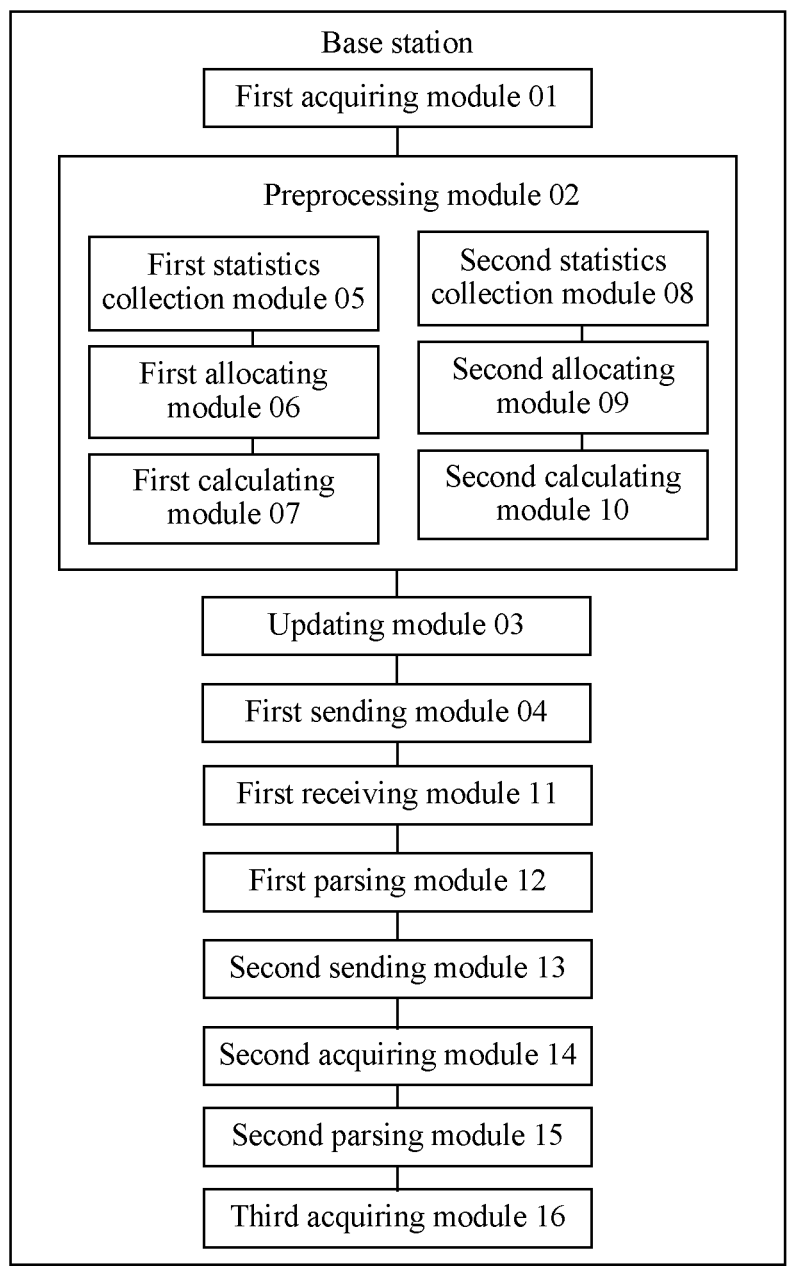
FIG. 17 is a schematic structural diagram 7 of a base station according to an embodiment of the present invention.

Further, as shown in FIG. 17, the base station further includes:

a third acquiring module 16, configured to: if a quantity of repetitions required for data changes into a fourth quantity of repetitions after the user equipment completes an operation of downlink synchronization, acquire a re-selection status that is sent by the user equipment and is of a control channel and a data channel that are of the corresponding fourth quantity of repetitions, so as to complete sending of signaling to the user equipment on the control channel and the data channel that are of the fourth quantity of repetitions, where the operation of downlink synchronization is used as a synchronization operation of eliminating a time difference between the user equipment and the base station caused by sleeping of the user equipment.

According to the base station provided in this embodiment of the present invention, location information and channel distribution information that are of each user equipment are acquired, bandwidth and quantities of data channels and control channels and quantities of repetitions corresponding to each data channel and each control channel are determined, and then bandwidth allocation information is updated according to the bandwidth and the quantities of data channels and control channels and the quantities of repetitions corresponding to each data channel and each control channel, where the bandwidth allocation information further includes frequency channel number positions of uplink and downlink narrowband and a position fixedly used as a time-frequency resource position of a random access channel RACH; then, broadcast information is sent to the user equipment, where the broadcast information in a broadcast channel includes at least the bandwidth allocation information, so that each user equipment determines, according to the bandwidth allocation information, a control channel and a data channel that are of a corresponding quantity of repetitions and are required for sending data. In the solution, preprocessing is performed on a time-frequency resource of a channel, and effective dynamic division is performed on the time-frequency resource of the channel; then, a base station writes, into bandwidth allocation information in broadcast information, preset bandwidth and quantities of each data channel and each control channel and preset quantities of repetitions corresponding to each data channel and each control channel. After receiving the broadcast information, user equipment accordingly obtains a scheme for performing effective dynamic division on the time-frequency resource of the channel, that is, the bandwidth and the quantities of each data channel and each control channel and the quantities of repetitions corresponding to each data channel and each control channel; the user equipment parses parameters in the broadcast information, so as to complete a corresponding channel selection operation, which implements semi-static adjustment performed by the base station on the user equipment, and therefore, sending data by a channel optimizes a process of performing data interaction between the base station and the user equipment.

Embodiment 4

Figure 18:
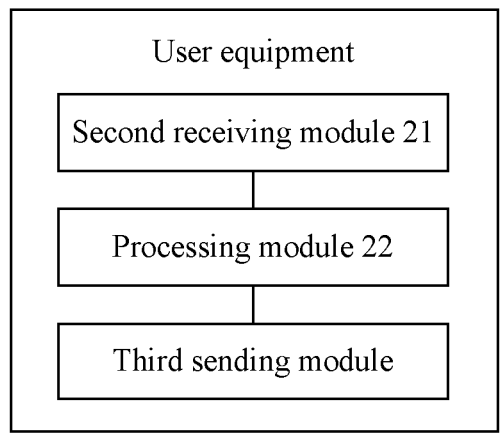
FIG. 18 is a schematic structural diagram 1 of user equipment according to an embodiment of the present invention.

An embodiment of the present invention provides user equipment. As shown in FIG. 18, the user equipment includes:

a second receiving module 21, configured to receive broadcast information broadcast by a base station, where the broadcast information includes at least bandwidth allocation information, the bandwidth allocation information is determined by the base station by acquiring location information and channel distribution information that are of each user equipment, where the location information of each user equipment is used to indicate coordinates of each user equipment, and the channel distribution information is used to indicate a channel used by each user equipment and a quantity of repetitions of sending data on the channel; and then, by determining, by the base station according to the location information and the channel distribution information that are of each user equipment, bandwidth and quantities of data channels and control channels and quantities of repetitions corresponding to the data channel and the control channel, and further by updating the bandwidth allocation information according to the bandwidth and the quantities of data channels and control channels and the quantities of repetitions corresponding to the data channel and the control channel, where the bandwidth allocation information includes preset bandwidth and quantities of each data channel and each control channel and preset quantities of repetitions corresponding to each data channel and each control channel, frequency channel number positions of uplink and downlink narrowband, and a position fixedly used as a time-frequency resource position of a random access channel RACH;

a processing module 22, configured to determine, according to the broadcast information in a broadcast channel and the recorded channel distribution information of each user equipment, a control channel and a data channel that are of a corresponding first quantity of repetitions; and a third sending module 23, configured to send data and the channel distribution information to the base station according to a preset rule by using the control channel and the data channel that are of the first quantity of repetitions.

Figure 19:
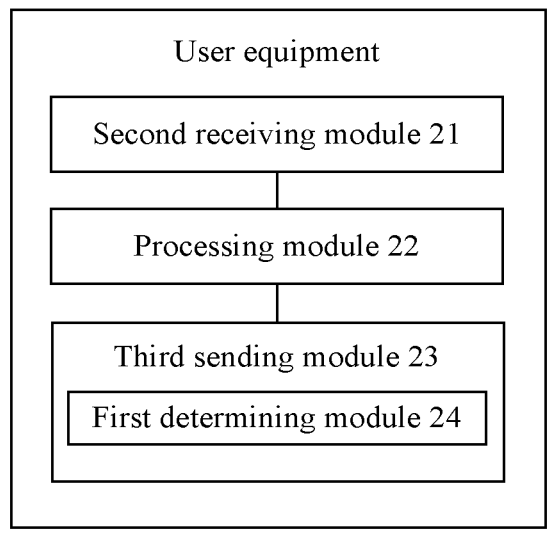
FIG. 19 is a schematic structural diagram 2 of user equipment according to an embodiment of the present invention.

Further, as shown in FIG. 19, the third sending module further includes a first determining module 24, specifically configured to:

if the data can be completely sent within one frame, embed a user equipment identity UEID in the transmitted data; and send, to the base station according to the control channel and the data channel that are of the first quantity of repetitions, the channel distribution information and the data embedded with the user equipment identity UEID.

Further, the third sending module 23 is specifically configured to:

if the data cannot be completely sent within one frame, separately embed a user equipment identity UEID and a buffer status report BSR in the transmitted data;

send, to the base station according to the control channel and the data channel that are of the first quantity of repetitions, the channel distribution information and a part of the transmitted data embedded with the user equipment identity UEID and the buffer status report BSR;

acquire scheduling information of the base station, where the scheduling information includes an adjusted second quantity of uplink repetitions that is obtained after the base station parses the part of data embedded with the user equipment identity UEID and the buffer status report BSR; and send a remaining part of data to the base station according to the second quantity of repetitions in the scheduling information.

Figure 20:
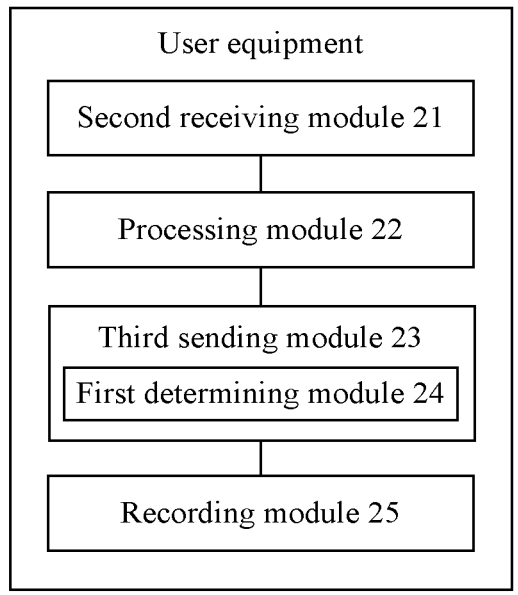
FIG. 20 is a schematic structural diagram 3 of user equipment according to an embodiment of the present invention.

Further, as shown in FIG. 20, the user equipment further includes:

a recording module 25, configured to record the first quantity of repetitions of the corresponding control channel and data channel that send the data, so that when re-sending the data, the user equipment determines the control channel and the data channel that are of the corresponding first quantity of repetitions.

Figure 21:
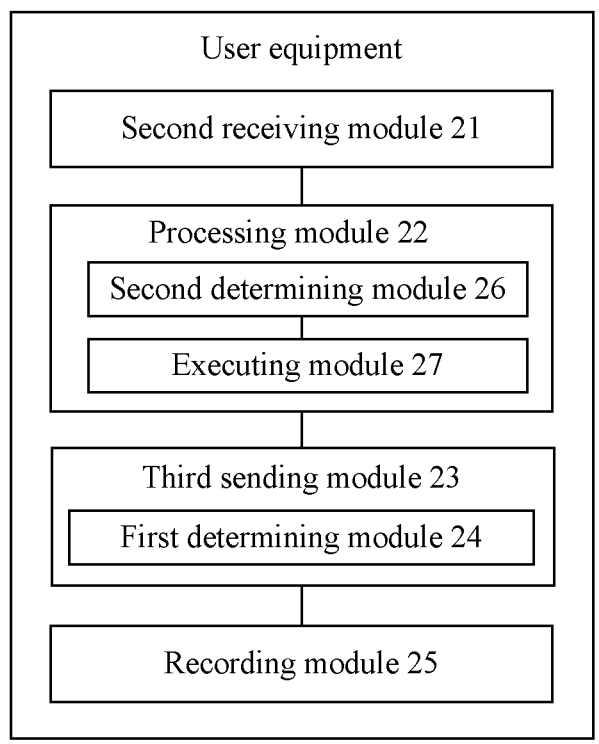
FIG. 21 is a schematic structural diagram 4 of user equipment according to an embodiment of the present invention.

Further, as shown in FIG. 21, the processing module 22 further includes:

a second determining module 26, configured to determine whether the control channel and the data channel that are of the data and of the first quantity of repetitions are recorded; and an executing module 27, configured to: if the control channel and the data channel that are of the data and of the first quantity of repetitions are not recorded, perform information combining on the continuously received broadcast information, and parse the combined broadcast information according to preset parsing code to determine the control channel and the data channel that are of the corresponding first quantity of repetitions; or if the control channel and the data channel that are of the data and of the first quantity of repetitions are recorded, send data to the base station by re-using the control channel and the data channel that are of the first quantity of repetitions.

Figure 22:
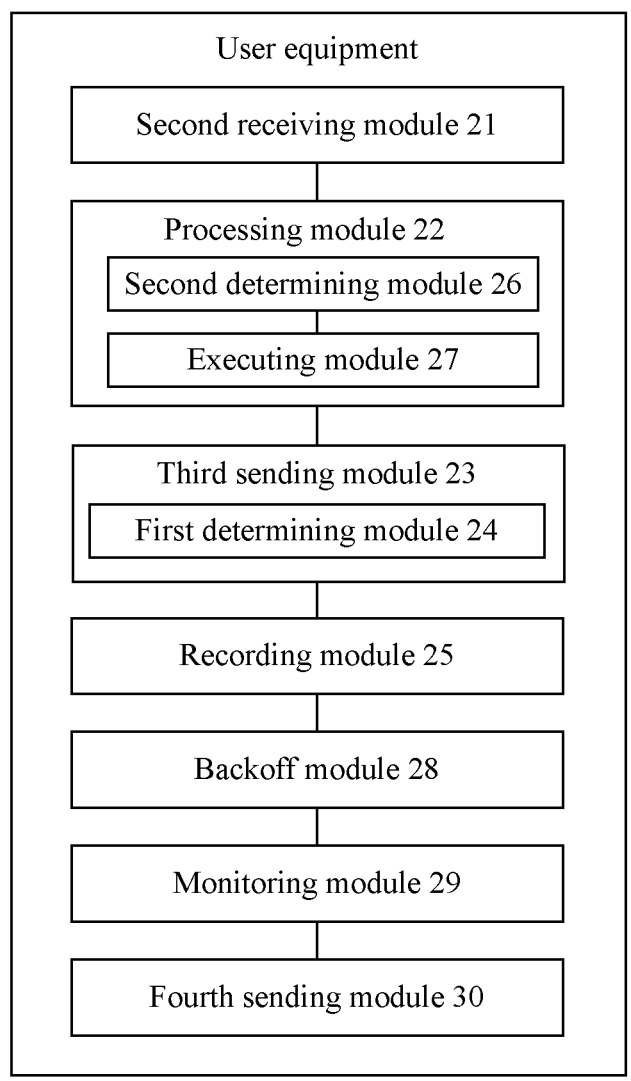
FIG. 22 is a schematic structural diagram 5 of user equipment according to an embodiment of the present invention.

Further, as shown in FIG. 22, the user equipment further includes:

a backoff module 28, configured to: if sending the data to the base station according to the preset rule by using the control channel and the data channel that are of the first quantity of repetitions fails, perform a preset time of backoff according to random backoff time in the broadcast information;

a monitoring module 29, configured to monitor the broadcast information in the broadcast channel; and a fourth sending module 30, configured to re-send the data to the base station according to a random backoff probability in the broadcast information.

Figure 23:
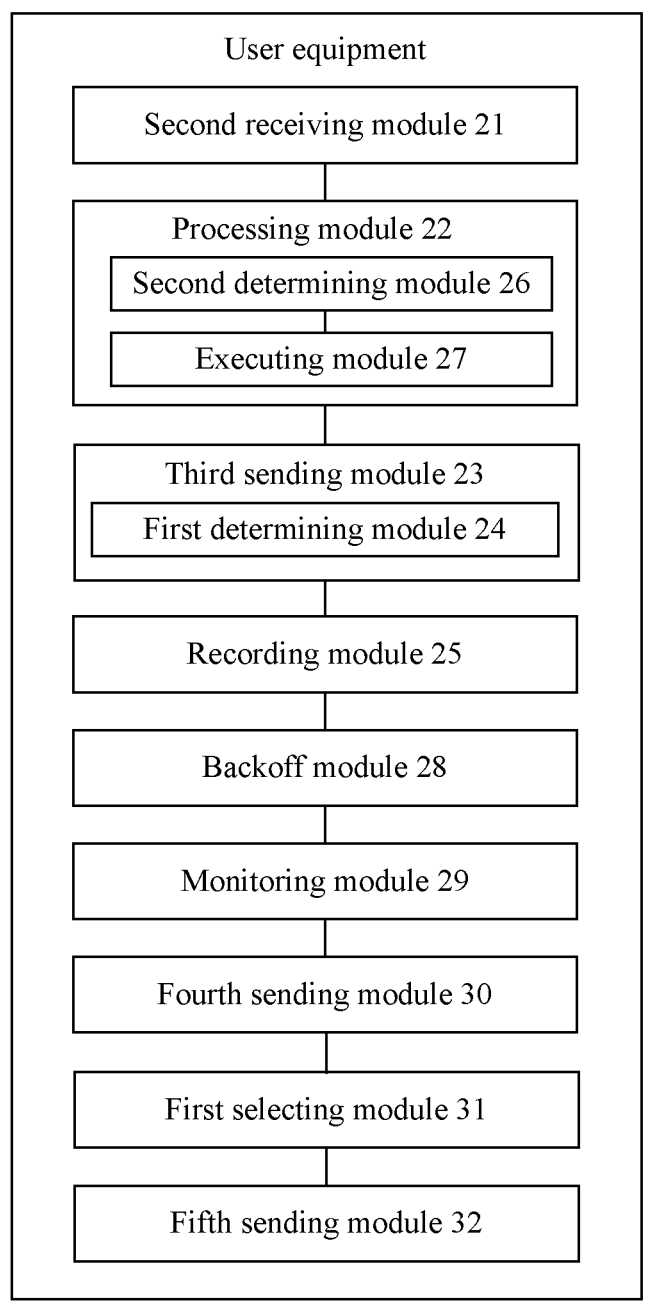
FIG. 23 is a schematic structural diagram 6 of user equipment according to an embodiment of the present invention.

Further, as shown in FIG. 23, the user equipment further includes:

a first selecting module 31, configured to: if a quantity of data retransmissions performed according to the random backoff probability in the broadcast information is greater than a preset maximum threshold, re-select, according to the current first quantity of repetitions of the control channel and the data channel, a control channel and a data channel that are of a third quantity of repetitions that is greater than the first quantity of repetitions; and a fifth sending module 32, configured to send the data and the channel distribution information to the base station according to the control channel and the data channel that are of the third quantity of repetitions, so that the base station sends signaling to the user equipment on the re-selected control channel and data channel that are of the third quantity of repetitions, where the data is embedded with a user equipment identity UEID.

Figure 24:
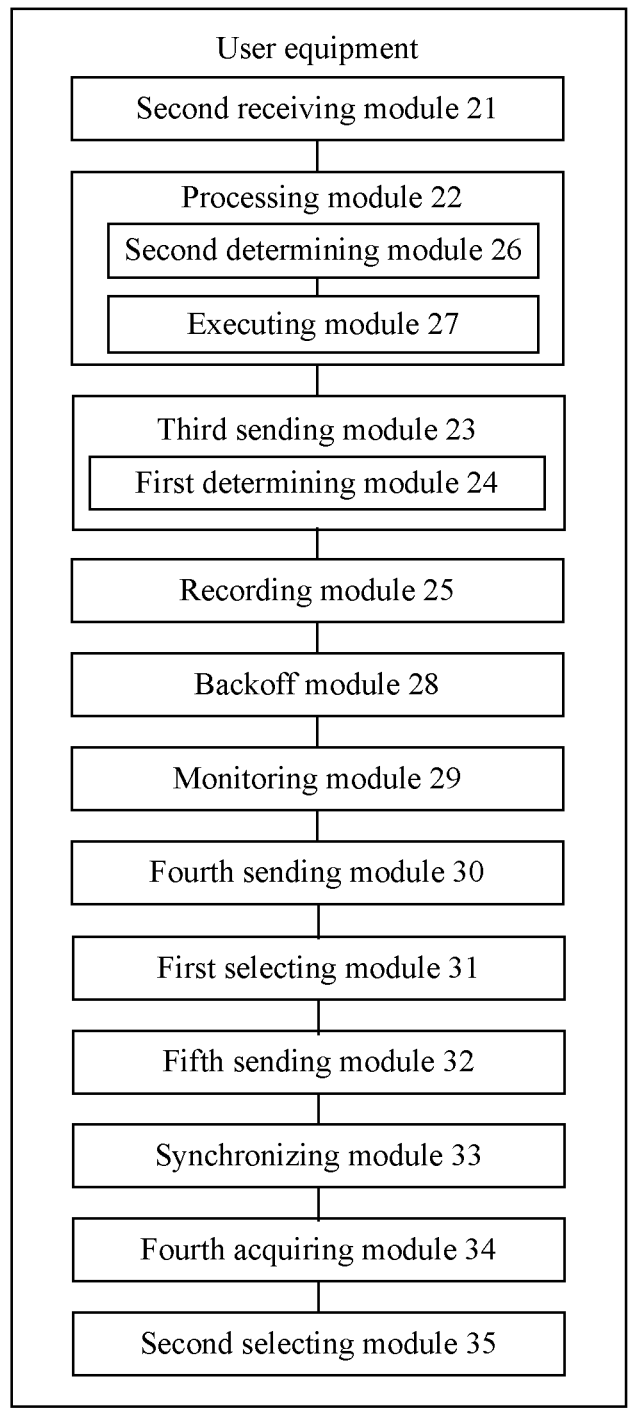
FIG. 24 is a schematic structural diagram 7 of user equipment according to an embodiment of the present invention.

Further, as shown in FIG. 24, the user equipment further includes:

a synchronizing module 33, configured to perform an operation of downlink synchronization with the base station, so as to eliminate a time difference between the user equipment and the base station caused by sleeping of the user equipment;

a fourth acquiring module 34, configured to acquire a time for completing the operation of downlink synchronization; and a second selecting module 35, configured to determine, according to the time for the operation of downlink synchronization and a preset relationship between a preset time for the operation of downlink synchronization and channel selection, a control channel and a data channel that are of a fourth quantity of repetitions.

Figure 25:
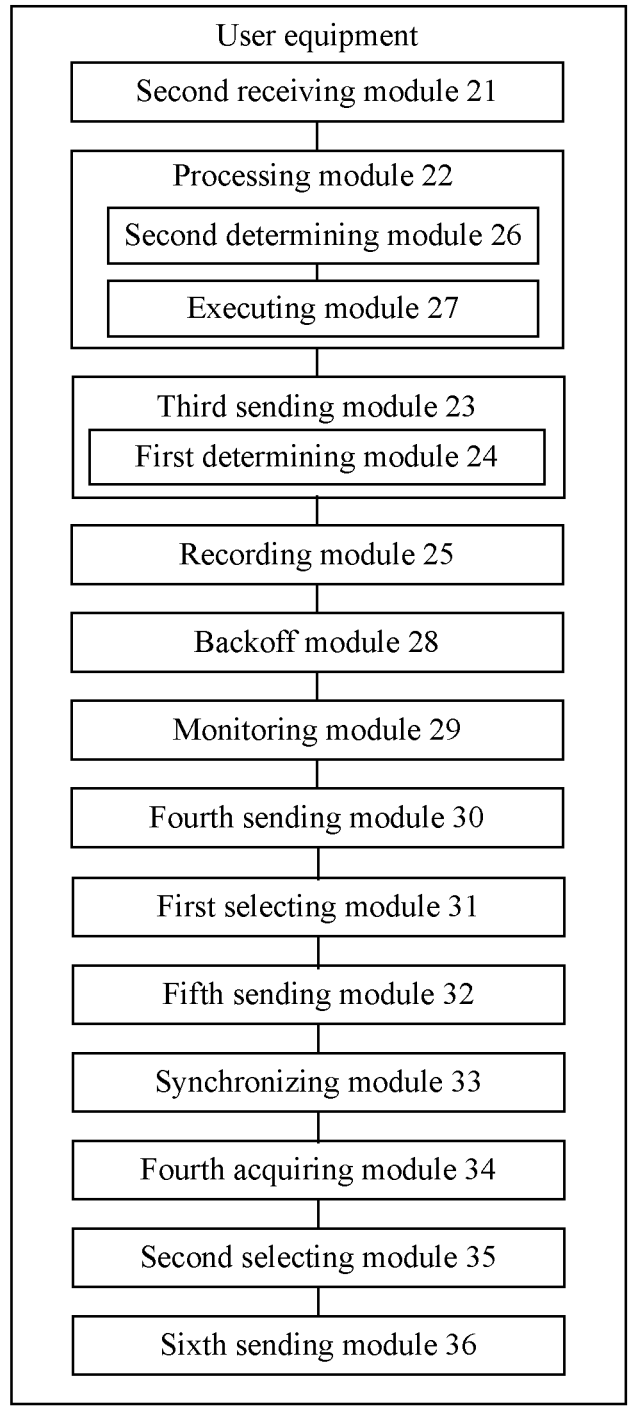
FIG. 25 is a schematic structural diagram 8 of user equipment according to an embodiment of the present invention.

Further, as shown in FIG. 25, if the fourth quantity of repetitions is different from the first quantity of repetitions, the user equipment further includes:

a sixth sending module 36, configured to send the data and the channel distribution information to the base station according to the control channel and the data channel that are of the fourth quantity of repetitions, so that the base station sends signaling to the user equipment on the re-selected control channel and data channel that are of the fourth quantity of repetitions.

According to the user equipment provided in this embodiment of the present invention, location information and channel distribution information that are of each user equipment are acquired, bandwidth and quantities of data channels and control channels and quantities of repetitions corresponding to each data channel and each control channel are determined, and then bandwidth allocation information is updated according to the bandwidth and the quantities of data channels and control channels and the quantities of repetitions corresponding to each data channel and each control channel, where the bandwidth allocation information further includes frequency channel number positions of uplink and downlink narrowband and a position fixedly used as a time-frequency resource position of a random access channel RACH; then, broadcast information is sent to the user equipment, where the broadcast information in a broadcast channel includes at least the bandwidth allocation information, so that each user equipment determines, according to the bandwidth allocation information, a control channel and a data channel that are of a corresponding quantity of repetitions and are required for sending data. In the solution, preprocessing is performed on a time-frequency resource of a channel according to a use status fed back by user equipment, and effective dynamic division is performed on the time-frequency resource of the channel, so as to change a conventional common mode of a channel into a multiplexing mode in which time division or frequency division or time-frequency division is performed on a channel according to a real-time use status of the user equipment, which greatly improves utilization efficiency of the original channel, thereby maximizing utilization of the time-frequency resource in a process of performing data interaction between a base station and the user equipment, and further improving stability and efficiency in a data transmission process.

Embodiment 5

Figure 26:
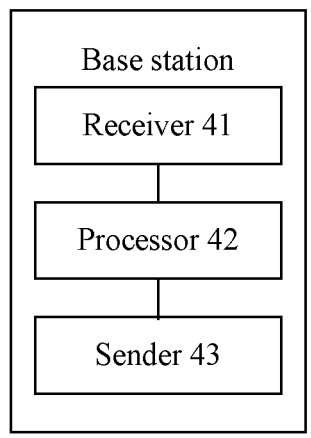
FIG. 26 is a schematic structural diagram 8 of a base station according to an embodiment of the present invention.

An embodiment of the present invention provides a base station. As shown in FIG. 26, the base station includes:

a receiver 41, configured to acquire location information and channel distribution information that are of each user equipment, where the location information of each user equipment is used to indicate coordinates of each user equipment, and the channel distribution information is used to indicate a channel used by each user equipment and a quantity of repetitions of sending data on the channel;

a processor 42, configured to: determine, according to the location information and the channel distribution information that are of each user equipment, bandwidth and quantities of data channels and control channels and quantities of repetitions corresponding to the data channel and the control channel; and update bandwidth allocation information according to the bandwidth and the quantities of data channels and control channels and the quantities of repetitions corresponding to the data channel and the control channel, where the bandwidth allocation information is used to indicate time-frequency positions of and the quantities of repetitions of the control channel and the data channel; and a sender 43, configured to send broadcast information to each user equipment by using a broadcast channel, where the broadcast information includes at least the bandwidth allocation information, so that each user equipment determines, according to the bandwidth allocation information, a control channel and a data channel that are of a corresponding quantity of repetitions and are required for sending data, and then each user equipment chooses to receive and send data on the corresponding control channel and data channel.

Further, the processor 42 is further configured to: collect statistics on the location information and the channel distribution information that are of each user equipment to obtain user equipment allocation ratios of each data channel and each control channel that are of a corresponding quantity of repetitions; configure, according to the user equipment allocation ratios of each data channel and each control channel that are of the corresponding quantity of repetitions, occupied time of each data channel and each control channel that are of the corresponding quantity of repetitions; and determine, according to the occupied time of each data channel and each control channel that are of a different quantity of repetitions, the bandwidth and the quantities of data channels and control channels and the quantities of repetitions corresponding to the data channel and the control channel.

Further, the processor 42 is further configured to: collect statistics on the location information and the channel distribution information that are of each user equipment to obtain user equipment allocation ratios of each data channel and each control channel that are of a corresponding quantity of repetitions; configure, according to the user equipment allocation ratios of each data channel and each control channel that are of the corresponding quantity of repetitions, occupied frequencies and/or occupied time frequencies of each data channel and each control channel that are of the corresponding quantity of repetitions; and determine, according to the occupied frequencies and/or the occupied time frequencies of each data channel and each control channel that are of a different quantity of repetitions, the bandwidth and the quantities of data channels and control channels and the quantities of repetitions corresponding to the data channel and the control channel.

Further, the bandwidth allocation information further includes frequency channel number positions of uplink and downlink narrowband and a position fixedly used as a time-frequency resource position of a random access channel RACH; where:

the frequency channel number positions of the uplink and downlink narrowband are used to indicate frequency band resources occupied by the uplink and downlink narrowband; and the time-frequency resource position of the random access channel RACH is used to indicate a position of a resource that is used for competitive access.

Further, the broadcast information further includes: access control information, a cell ID, public land mobile network PLMN information, a system frame number, a system message change indication, random backoff time, and a random backoff probability, where:

the access control information is used to indicate a type of user equipment that is allowed for access or allowed to send data;

the cell ID is physical identification information of a cell, and is used to distinguish different cells;

the PLMN information is used to distinguish different operator networks, so as to perform access control;

the system frame number is used to indicate a current running time point of a base station;

the system message change indication is used to indicate whether a system message of user equipment changes;

the random backoff time is used to indicate sleep duration of user equipment after the user equipment fails to send data; and the random backoff probability is used to indicate whether to perform a backoff operation, and a probability of performing the backoff operation.

Further, the receiver 41 is further configured to:

receive the channel distribution information and data embedded with a user equipment identity UEID, where the channel distribution information and the data are sent by the user equipment according to a control channel and a data channel that are of a corresponding quantity of repetitions; or receive the channel distribution information and a part of data embedded with a user equipment identity UEID and a buffer status report BSR, where the channel distribution information and the part of data are sent by the user equipment according to a control channel and a data channel that are of a corresponding quantity of repetitions.

Further, the receiver 41 is further configured to: if the user equipment fails to send the data according to the control channel and the data channel that are of the corresponding quantity of repetitions, and a quantity of data retransmissions performed by the user equipment according to a random backoff probability in the broadcast information is greater than a preset maximum threshold, acquire data that is sent by the user equipment on a control channel and a data channel that are of a corresponding third quantity of repetitions; and the sender 43 is further configured to parse a user equipment identity UEID embedded in the data that is on the control channel and the data channel that are of the third quantity of repetitions, so that the base station sends a control command on the control channel and the data channel that are of the third quantity of repetitions.

Further, the receiver 41 is further configured to: if a quantity of repetitions required for data changes into a fourth quantity of repetitions after the user equipment completes an operation of downlink synchronization, acquire a re-selection status that is sent by the user equipment and is of a control channel and a data channel that are of the corresponding fourth quantity of repetitions, so as to complete sending of signaling to the user equipment on the control channel and the data channel that are of the fourth quantity of repetitions, where the operation of downlink synchronization is used as a synchronization operation of eliminating a time difference between the user equipment and the base station caused by sleeping of the user equipment.

Further, the receiver 41 is further configured to: if a quantity of repetitions required for data changes into a fourth quantity of repetitions after the user equipment completes an operation of downlink synchronization, acquire a re-selection status that is sent by the user equipment and is of a control channel and a data channel that are of the corresponding fourth quantity of repetitions, so as to complete sending of signaling to the user equipment on the control channel and the data channel that are of the fourth quantity of repetitions, where the operation of downlink synchronization is used as a synchronization operation of eliminating a time difference between the user equipment and the base station caused by sleeping of the user equipment.

According to the base station provided in this embodiment of the present invention, location information and channel distribution information that are of each user equipment are acquired, bandwidth and quantities of data channels and control channels and quantities of repetitions corresponding to each data channel and each control channel are determined, and then bandwidth allocation information is updated according to the bandwidth and the quantities of data channels and control channels and the quantities of repetitions corresponding to each data channel and each control channel, where the bandwidth allocation information further includes frequency channel number positions of uplink and downlink narrowband and a position fixedly used as a time-frequency resource position of a random access channel RACH; then, broadcast information is sent to the user equipment, where the broadcast information in a broadcast channel includes at least the bandwidth allocation information, so that each user equipment determines, according to the bandwidth allocation information, a control channel and a data channel that are of a corresponding quantity of repetitions and are required for sending data. In the solution, preprocessing is performed on a time-frequency resource of a channel, and effective dynamic division is performed on the time-frequency resource of the channel; then, a base station writes, into bandwidth allocation information in broadcast information, preset bandwidth and quantities of each data channel and each control channel and preset quantities of repetitions corresponding to each data channel and each control channel. After receiving the broadcast information, user equipment accordingly obtains a scheme for performing effective dynamic division on the time-frequency resource of the channel, that is, the bandwidth and the quantities of each data channel and each control channel and the quantities of repetitions corresponding to each data channel and each control channel; the user equipment parses parameters in the broadcast information, so as to complete a corresponding channel selection operation, which implements semi-static adjustment performed by the base station on the user equipment, and therefore, sending data by a channel optimizes a process of performing data interaction between the base station and the user equipment.

Embodiment 6

Figure 27:
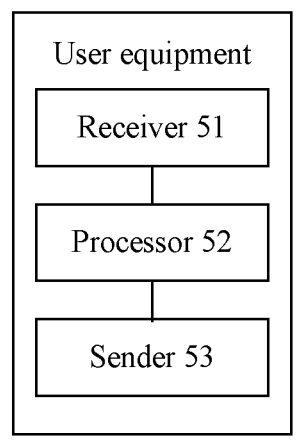
FIG. 27 is a schematic structural diagram 9 of user equipment according to an embodiment of the present invention.

An embodiment of the present invention provides user equipment. As shown in FIG. 27, the user equipment includes:

a receiver 51, configured to receive broadcast information broadcast by a base station, where the broadcast information includes at least bandwidth allocation information, the bandwidth allocation information is determined by the base station by acquiring location information and channel distribution information that are of each user equipment, where the location information of each user equipment is used to indicate coordinates of each user equipment, and the channel distribution information is used to indicate a channel used by each user equipment and a quantity of repetitions of sending data on the channel; and then, by determining, by the base station according to the location information and the channel distribution information that are of each user equipment, bandwidth and quantities of data channels and control channels and quantities of repetitions corresponding to the data channel and the control channel, and further by updating the bandwidth allocation information according to the bandwidth and the quantities of data channels and control channels and the quantities of repetitions corresponding to the data channel and the control channel, where the bandwidth allocation information includes preset bandwidth and quantities of each data channel and each control channel and preset quantities of repetitions corresponding to each data channel and each control channel, frequency channel number positions of uplink and downlink narrowband, and a position fixedly used as a time-frequency resource position of a random access channel RACH;

a processor 52, configured to determine, according to the broadcast information in a broadcast channel and a recorded running status of the user equipment, a control channel and a data channel that are of a corresponding first quantity of repetitions; and a sender 53, configured to send data and the channel distribution information to the base station according to a preset rule by using the control channel and the data channel that are of the first quantity of repetitions.

Further, the broadcast information further includes: access control information, a cell ID, public land mobile network PLMN information, a system frame number, a system message change indication, random backoff time, and a random backoff probability, where:

the access control information is used to indicate a type of user equipment that is allowed for access or allowed to send data;

the cell ID is physical identification information of a cell, and is used to distinguish different cells;

the PLMN information is used to distinguish different operator networks, so as to perform access control;

the system frame number is used to indicate a current running time point of a base station;

the system message change indication is used to indicate whether a system message of user equipment changes;

the random backoff time is used to indicate sleep duration of user equipment after the user equipment fails to send data; and the random backoff probability is used to indicate whether to perform a backoff operation, and a probability of performing the backoff operation.

Further, the processor 52 is further configured to: if it is determined that the data can be completely sent within one frame, embed a user equipment identity UEID in the transmitted data; and the sender 53 is further configured to send, to the base station according to the control channel and the data channel that are of the first quantity of repetitions, the channel distribution information and the data embedded with the user equipment identity UEID.

Further, the processor 52 is further configured to: if the data cannot be completely sent within one frame, separately embed a user equipment identity UEID and a buffer status report BSR in the transmitted data;

the receiver 51 is further configured to acquire scheduling information of the base station, where the scheduling information includes an adjusted second quantity of uplink repetitions that is obtained after the base station parses a part of data embedded with the user equipment identity UEID and the buffer status report BSR; and the sender 53 is further configured to: send, to the base station according to the control channel and the data channel that are of the first quantity of repetitions, the channel distribution information and the part of the transmitted data embedded with the user equipment identity UEID and the buffer status report BSR; and send a remaining part of data to the base station according to the second quantity of repetitions in the scheduling information.

Further, the processor 52 is further configured to record the first quantity of repetitions of the corresponding control channel and data channel that send the data, so that when re-sending the data, the user equipment determines the control channel and the data channel that are of the corresponding first quantity of repetitions.

Figure 28:
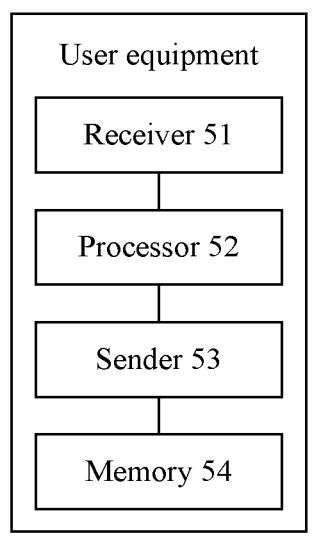
FIG. 28 is a schematic structural diagram 10 of user equipment according to an embodiment of the present invention.

Further, as shown in FIG. 28, the user equipment further includes a memory 54, which is configured to record the first quantity of repetitions of the corresponding control channel and data channel that send the data, so that when re-sending the data, the user equipment determines the control channel and the data channel that are of the corresponding first quantity of repetitions.

Further, the processor 52 is further configured to: determine whether the control channel and the data channel that are of the data and of the first quantity of repetitions are recorded; and if the control channel and the data channel that are of the data and of the first quantity of repetitions are not recorded, perform information combining on the continuously received broadcast information, and parse the combined broadcast information according to preset parsing code to determine the control channel and the data channel that are of the corresponding first quantity of repetitions; or if the control channel and the data channel that are of the data and of the first quantity of repetitions are recorded, send data to the base station by re-using the control channel and the data channel that are of the first quantity of repetitions.

Further, the processor 52 is further configured to: if sending the data to the base station according to the preset rule by using the control channel and the data channel that are of the first quantity of repetitions fails, perform a preset time of backoff according to random backoff time in the broadcast information; and monitor the broadcast information in the broadcast channel; and the sender 53 is further configured to re-send the data to the base station according to a random backoff probability in the broadcast information.

Further, the processor 52 is further configured to: if a quantity of data retransmissions performed according to the random backoff probability in the broadcast information is greater than a preset maximum threshold, re-select, according to the current first quantity of repetitions of the control channel and the data channel, a control channel and a data channel that are of a third quantity of repetitions that is greater than the first quantity of repetitions; and the sender 53 is further configured to send the data and the channel distribution information to the base station according to the control channel and the data channel that are of the third quantity of repetitions, so that the base station sends signaling to the user equipment on the re-selected control channel and data channel that are of the third quantity of repetitions, where the data is embedded with a user equipment identity UEID.

Further, the processor 52 is further configured to: perform an operation of downlink synchronization with the base station, so as to eliminate a time difference between the user equipment and the base station caused by sleeping of the user equipment; and determine, according to a time for the operation of downlink synchronization and a preset relationship between a preset time for the operation of downlink synchronization and channel selection, a control channel and a data channel that are of a fourth quantity of repetitions; and the receiver 51 is further configured to acquire the time for completing the operation of downlink synchronization.

Further, the sender 53 is further configured to send the data and the channel distribution information to the base station according to the control channel and the data channel that are of the fourth quantity of repetitions, so that the base station sends signaling to the user equipment on the re-selected control channel and data channel that are of the fourth quantity of repetitions.

According to the user equipment provided in this embodiment of the present invention, location information and channel distribution information that are of each user equipment are acquired, bandwidth and quantities of data channels and control channels and quantities of repetitions corresponding to each data channel and each control channel are determined, and then bandwidth allocation information is updated according to the bandwidth and the quantities of data channels and control channels and the quantities of repetitions corresponding to each data channel and each control channel, where the bandwidth allocation information further includes frequency channel number positions of uplink and downlink narrowband and a position fixedly used as a time-frequency resource position of a random access channel RACH; then, broadcast information is sent to the user equipment, where the broadcast information in a broadcast channel includes at least the bandwidth allocation information, so that each user equipment determines, according to the bandwidth allocation information, a control channel and a data channel that are of a corresponding quantity of repetitions and are required for sending data. In the solution, preprocessing is performed on a time-frequency resource of a channel according to a use status fed back by user equipment, and effective dynamic division is performed on the time-frequency resource of the channel, so as to change a conventional common mode of a channel into a multiplexing mode in which time division or frequency division or time-frequency division is performed on a channel according to a real-time use status of the user equipment, which greatly improves utilization efficiency of the original channel, thereby maximizing utilization of the time-frequency resource in a process of performing data interaction between a base station and the user equipment, and further improving stability and efficiency in a data transmission process.

Various aspects are described in this specification with reference to a terminal and/or a base station and/or a base station controller.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges language and/or data with the radio access network. For example, it may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The base station (for example, an access point) may refer to a device in communication with a wireless terminal via one or more sectors at an air interface in an access network. The base station may be used to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base transceiver station (BTS, Base Transceiver Station) in GSM or CDMA, may be a NodeB (NodeB) in WCDMA, or may be an evolved NodeB (NodeB, eNB, or e-NodeB, evolutional Node B) in LTE, which is not limited in the present invention.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A broadcast control bandwidth allocation and data transceiving method, wherein the method comprises:
   acquiring location information and channel distribution information that are of each user equipment, wherein the location information of each user equipment is used to indicate coordinates of each user equipment, and the channel distribution information is used to indicate a channel used by each user equipment and a quantity of repetitions of sending data on the channel by each user equipment;

determining, according to the location information and the channel distribution information that are of each user equipment, bandwidth and quantities of data channels and control channels and quantities of repetitions corresponding to the data channel and the control channel, comprising:

collecting statistics on the location information and the channel distribution information that are of each user equipment to obtain user equipment allocation ratios of each data channel and each control channel that are of a corresponding quantity of repetitions;

configuring, according to the user equipment allocation ratios of each data channel and each control channel that are of the corresponding quantity of repetitions, occupied time, occupied frequencies, and/or occupied time frequencies of each data channel and each control channel that are of the corresponding quantity of repetitions; and determining, according to the occupied time, occupied frequencies, and/or occupied time frequencies of each data channel and each control channel that are corresponding to the quantities of repetitions, the bandwidth and the quantities of data channels and control channels and the quantities of repetitions corresponding to the data channel and the control channel;

updating bandwidth allocation information according to the bandwidth and the quantities of data channels and control channels and the quantities of repetitions corresponding to the data channel and the control channel, wherein the bandwidth allocation information is used to indicate time-frequency positions of and the quantities of repetitions of the control channel and the data channel; and sending broadcast information to each user equipment by using a broadcast channel, wherein the broadcast information comprises at least the bandwidth allocation information, so that each user equipment determines, according to the bandwidth allocation information, a control channel and a data channel that are corresponding to quantities of repetitions required for sending data, and then each user equipment chooses to receive and send data on the corresponding control channel and data channel.

2. The broadcast control bandwidth allocation and data transceiving method according to claim 1, wherein the bandwidth allocation information further comprises frequency positions of uplink and downlink narrowband and a position fixedly used as a time-frequency resource position of a random access channel RACH; wherein the frequency positions of the uplink and downlink narrowband are used to indicate frequency band resources occupied by the uplink and downlink narrowband; and the time-frequency resource position of the random access channel RACH is used to indicate a position of a contention-based access resource.

3. The broadcast control bandwidth allocation and data transceiving method according to claim 1, wherein the broadcast information further comprises one or more types of the following information: access control information, a cell ID, public land mobile network PLMN information, a system frame number, a system message change indication, random backoff time, and a random backoff probability, wherein the access control information is used to indicate a type of user equipment that is allowed for access or allowed to send data;

the cell ID is physical identification information of a cell, and is used to distinguish different cells;

the PLMN information is used to distinguish different operator networks, so as to perform access control;

the system frame number is used to indicate a current running time point of a base station;

the system message change indication is used to indicate whether a system message of user equipment changes;

the random backoff time is used to indicate sleep duration of user equipment after the user equipment fails to send data; and the random backoff probability is used to indicate whether to perform a backoff operation, and a probability of performing the backoff operation.

4. The broadcast control bandwidth allocation and data transceiving method according to claim 1, after the sending broadcast information to each user equipment by using a broadcast channel, further comprising:

receiving the channel distribution information and data embedded with a user equipment identity UEID, wherein the channel distribution information and the data are sent by the user equipment according to a control channel and a data channel that are of a corresponding quantity of repetitions; or receiving the channel distribution information and a part of data embedded with a user equipment identity UEID and a buffer status report BSR, wherein the channel distribution information and the part of data are sent by the user equipment according to a control channel and a data channel that are of a corresponding quantity of repetitions.

5. The broadcast control bandwidth allocation and data transceiving method according to claim 4, after the receiving the channel distribution information and data embedded with a user equipment identity UEID, wherein the channel distribution information and the data are sent by the user equipment according to a control channel and a data channel that are of a corresponding quantity of repetitions, further comprising:

parsing the data and the channel distribution information to obtain a second quantity of repetitions; and sending scheduling information that comprises the second quantity of repetitions to the user equipment, so that the user equipment adjusts an original quantity of repetitions to the second quantity of repetitions according to the scheduling information to perform data sending.

6. The broadcast control bandwidth allocation and data transceiving method according to claim 4, after the receiving the channel distribution information and data embedded with a user equipment identity UEID, wherein the channel distribution information and the data are sent by the user equipment according to a control channel and a data channel that are of a corresponding quantity of repetitions, or the receiving the channel distribution information and a part of data embedded with a user equipment identity UEID and a buffer status report BSR, wherein the channel distribution information and the part of data are sent by the user equipment according to a control channel and a data channel that are of a corresponding quantity of repetitions, further comprising:

if the user equipment fails to send the data according to the control channel and the data channel that are of the corresponding quantity of repetitions, and a quantity of data retransmissions performed by the user equipment according to a random backoff probability in the broadcast information is greater than a preset maximum threshold, acquiring data that is sent by the user equipment on a control channel and a data channel that are of a corresponding third quantity of repetitions; and parsing a user equipment identity UEID embedded in the data that is on the control channel and the data channel that are of the third quantity of repetitions, so that a base station sends a control command on the control channel and the data channel that are of the third quantity of repetitions.

7. The broadcast control bandwidth allocation and data transceiving method according to claim 4, after the receiving the channel distribution information and data embedded with a user equipment identity UEID, wherein the channel distribution information and the data are sent by the user equipment according to a control channel and a data channel that are of a corresponding quantity of repetitions, or the receiving the channel distribution information and a part of data embedded with a user equipment identity UEID and a buffer status report BSR, wherein the channel distribution information and the part of data are sent by the user equipment according to a control channel and a data channel that are of a corresponding quantity of repetitions, further comprising:

if a quantity of repetitions required for data changes into a fourth quantity of repetitions after the user equipment completes an operation of downlink synchronization, acquiring a re-selection status that is sent by the user equipment and is of a control channel and a data channel that are of the corresponding fourth quantity of repetitions, and then sending signaling to the user equipment on the control channel and the data channel that are of the fourth quantity of repetitions, wherein the operation of downlink synchronization is used as a synchronization operation of eliminating a time difference between the user equipment and a base station caused by sleeping of the user equipment.

8. A broadcast control bandwidth allocation and data transceiving method, wherein the method comprises:

receiving broadcast information broadcast by a base station, wherein the broadcast information comprises at least bandwidth allocation information, and the bandwidth allocation information is generated by the base station by acquiring location information and channel distribution information that are of each user equipment and determining bandwidth and quantities of data channels and control channels and quantities of repetitions corresponding to the data channel and the control channel, wherein the location information of each user equipment is used to indicate coordinates of each user equipment, and the channel distribution information is used to indicate a channel used by each user equipment and a quantity of repetitions of sending data on the channel;

determining, according to the broadcast information in a broadcast channel and the recorded channel distribution information of each user equipment, a control channel and a data channel that are of a corresponding first quantity of repetitions; and sending data and the channel distribution information to the base station according to a preset rule by using the control channel and the data channel that are of the first quantity of repetitions, comprising:

when the data can be completely sent within one frame, embedding a user equipment identity UEID in the transmitted data; and sending, to the base station by using the control channel and the data channel that are of the first quantity of repetitions, the channel distribution information and the data embedded with the user equipment identity UEID; and when the data cannot be completely sent within one frame, separately embedding a user equipment identity UEID and a buffer status report BSR in the transmitted data;

sending, to the base station by using the control channel and the data channel that are of the first quantity of repetitions, the channel distribution information and a part of the transmitted data embedded with the user equipment identity UEID and the buffer status report BSR;

acquiring scheduling information of the base station, wherein the scheduling information comprises an adjusted second quantity of repetitions that is obtained after the base station parses the part of data embedded with the user equipment identity UEID and the buffer status report BSR; and sending a remaining part of data to the base station by using the second quantity of repetitions in the scheduling information.

9. The broadcast control bandwidth allocation and data transceiving method according to claim 8, after the determining, according to the broadcast information in a broadcast channel and the recorded channel distribution information of each user equipment, a control channel and a data channel that are of a corresponding first quantity of repetitions, further comprising:

recording, as historical data, the first quantity of repetitions of the corresponding control channel and data channel that is used to send the data, so that when re-sending the data, the user equipment invokes the historical data to determine the control channel and the data channel that are of the corresponding first quantity of repetitions.

10. The broadcast control bandwidth allocation and data transceiving method according to claim 8, wherein the determining, according to the broadcast information in a broadcast channel and the recorded channel distribution information of the user equipment, a control channel and a data channel that are of a corresponding first quantity of repetitions comprises:

determining whether the control channel and the data channel that are of the data and of the first quantity of repetitions are recorded;

if the control channel and the data channel that are of the data and of the first quantity of repetitions are not recorded, performing information combining on the continuously received broadcast information; and parsing the combined broadcast information according to preset parsing code to determine the control channel and the data channel that are of the corresponding first quantity of repetitions; or if the control channel and the data channel that are of the data and of the first quantity of repetitions are recorded, invoking historical data to send data to the base station by re-using the control channel and the data channel that are of the first quantity of repetitions.

11. The broadcast control bandwidth allocation and data transceiving method according to claim 8, after the sending data and the channel distribution information to the base station according to a preset rule by using the control channel and the data channel that are of the first quantity of repetitions, further comprising:
　if sending the data to the base station according to the preset rule by using the control channel and the data channel that are of the first quantity of repetitions fails, performing a preset time of backoff according to random backoff time in the broadcast information;
　monitoring the broadcast information in the broadcast channel; and
　re-sending the data to the base station according to a random backoff probability in the broadcast information.

12. The broadcast control bandwidth allocation and data transceiving method according to claim 11, after the re-sending the data to the base station according to a random backoff probability in the broadcast information, further comprising:
　if a quantity of data retransmissions performed according to the random backoff probability in the broadcast information is greater than a preset maximum threshold, re-selecting, according to the current first quantity of repetitions of the control channel and the data channel, a control channel and a data channel that are of a third quantity of repetitions that is greater than the first quantity of repetitions; and
　sending the data and the channel distribution information to the base station by using the control channel and the data channel that are of the third quantity of repetitions, so that the base station sends signaling to the user equipment on the re-selected control channel and data channel that are of the third quantity of repetitions, wherein the data is embedded with a user equipment identity UEID.

13. The broadcast control bandwidth allocation and data transceiving method according to claim 8, wherein when the user equipment is woken up from a sleep state, the method further comprises:
　performing an operation of downlink synchronization with the base station, so as to eliminate a time difference between the user equipment and the base station caused by sleeping of the user equipment;
　acquiring a time for completing the operation of downlink synchronization; and
　determining, according to the time for the operation of downlink synchronization and a preset relationship between a preset time for completing the operation of downlink synchronization and channel selection, a control channel and a data channel that are of a fourth quantity of repetitions.

14. The broadcast control bandwidth allocation and data transceiving method according to claim 13, comprising: if the fourth quantity of repetitions is different from the first quantity of repetitions, sending the data and the channel distribution information to the base station according to the control channel and the data channel that are of the fourth quantity of repetitions, so that the base station sends signaling to the user equipment on the re-selected control channel and data channel that are of the fourth quantity of repetitions.

15. A base station, comprising:
　a receiver, configured to acquire location information and channel distribution information that are of each user equipment, wherein the location information of each user equipment is used to indicate coordinates of each user equipment, and the channel distribution information is used to indicate a channel used by each user equipment and a quantity of repetitions of sending data on the channel;
　a processor, configured to: determine, according to the location information and the channel distribution information that are of each user equipment, bandwidth and quantities of data channels and control channels and quantities of repetitions corresponding to the data channel and the control channel; and update bandwidth allocation information according to the bandwidth and the quantities of data channels and control channels and the quantities of repetitions corresponding to the data channel and the control channel, wherein the bandwidth allocation information is used to indicate time-frequency positions of and the quantities of repetitions of the control channel and the data channel, wherein the processor is further configured to: collect statistics on the location information and the channel distribution information that are of each user equipment to obtain user equipment allocation ratios of each data channel and each control channel that are of a corresponding quantity of repetitions; configure, according to the user equipment allocation ratios of each data channel and each control channel that are of the corresponding quantity of repetitions, occupied time, occupied frequencies, and/or occupied time frequencies of each data channel and each control channel that are of the corresponding quantity of repetitions; and determine, according to the occupied time occupied frequencies, and/or occupied time frequencies of each data channel and each control channel that are of a different quantity of repetitions, the bandwidth and the quantities of data channels and control channels and the quantities of repetitions corresponding to the data channel and the control channel; and
　a sender, configured to send broadcast information to each user equipment by using a broadcast channel, wherein the broadcast information comprises at least the bandwidth allocation information, so that each user equipment determines, according to the bandwidth allocation information, a control channel and a data channel that are of a corresponding quantity of repetitions and are required for sending data.

16. The base station according to claim 15, wherein:
　the receiver is further configured to receive the channel distribution information and data embedded with a user equipment identity UEID, wherein the channel distribution information and the data are sent by the user equipment according to a control channel and a data channel that are of a corresponding quantity of repetitions, and the user equipment is one of the user equipments; or
　receive the channel distribution information and a part of data embedded with a user equipment identity UEID and a buffer status report BSR, wherein the channel distribution information and the part of data are sent by the user equipment according to a control channel and a data channel that are of a corresponding quantity of repetitions.

17. The base station according to claim 16, wherein:
　the receiver is further configured to parse the channel distribution information and the part of data embedded with the user equipment identity UEID and the buffer status report BSR to obtain a parsed second quantity of repetitions, wherein the channel distribution information and the part of data are sent on the control channel and the data channel that are of the corresponding quantity of repetitions; and the sender is further configured to send scheduling information that comprises the second quantity of repetitions to the user equipment, so that the user equipment adjusts an original quantity of repetitions to the second quantity of repetitions according to the scheduling information to perform data sending.

18. The base station according to claim 15, wherein:

the receiver is further configured to: if the user equipment fails to send the data by using the control channel and the data channel that are of the corresponding quantity of repetitions, and a quantity of data retransmissions performed by the user equipment according to a random backoff probability in the broadcast information is greater than a preset maximum threshold, acquire data that is sent by the user equipment on a control channel and a data channel that are of a corresponding third quantity of repetitions; and the processor is further configured to parse a user equipment identity UEID embedded in the data that is on the control channel and the data channel that are of the third quantity of repetitions, so that the base station sends a control command on the control channel and the data channel that are of the third quantity of repetitions.

19. The base station according to claim 15, wherein:

the receiver is further configured to: if a quantity of repetitions required for data changes into a fourth quantity of repetitions after the user equipment completes an operation of downlink synchronization, acquire a re-selection status that is sent by the user equipment and is of a control channel and a data channel that are of the corresponding fourth quantity of repetitions, so as to complete sending of signaling to the user equipment on the control channel and the data channel that are of the fourth quantity of repetitions, wherein the operation of downlink synchronization is used as a synchronization operation of eliminating a time difference between the user equipment and the base station caused by sleeping of the user equipment.

20. User equipment, comprising:

a receiver, configured to receive broadcast information broadcast by a base station, wherein the broadcast information comprises at least bandwidth allocation information, the bandwidth allocation information is determined by the base station by acquiring location information and channel distribution information that are of each user equipment, wherein the location information of each user equipment is used to indicate coordinates of each user equipment, and the channel distribution information is used to indicate a channel used by each user equipment and a quantity of repetitions of sending data on the channel; and then, by determining, by the base station according to the location information and the channel distribution information that are of each user equipment, bandwidth and quantities of data channels and control channels and quantities of repetitions corresponding to the data channel and the control channel, and further by updating the bandwidth allocation information according to the bandwidth and the quantities of data channels and control channels and the quantities of repetitions corresponding to the data channel and the control channel, wherein the bandwidth allocation information comprises preset bandwidth and quantities of each data channel and each control channel and preset quantities of repetitions corresponding to each data channel and each control channel, frequency channel number positions of uplink and downlink narrowband, and a position fixedly used as a time-frequency resource position of a random access channel RACH, wherein the time-frequency resource position of the random access channel RACH is used to indicate a position of a resource that is used for competitive access;

a processor, configured to determine, according to the broadcast information in a broadcast channel and a recorded running status of the user equipment, a control channel and a data channel that are of a corresponding first quantity of repetitions; and a sender, configured to send data and the channel distribution information to the base station according to a preset rule by using the control channel and the data channel that are of the first quantity of repetitions, wherein the processor is further configured to:

when the data cannot be completely sent within one frame, separately embedding a user equipment identity UEID and a buffer status report BSR in the transmitted data;

sending, to the base station by using the control channel and the data channel that are of the first quantity of repetitions, the channel distribution information and a part of the transmitted data embedded with the user equipment identity UEID and the buffer status report BSR;

acquiring scheduling information of the base station, wherein the scheduling information comprises an adjusted second quantity of repetitions that is obtained after the base station parses the part of data embedded with the user equipment identity UEID and the buffer status report BSR; and sending a remaining part of data to the base station by using the second quantity of repetitions in the scheduling information; and when it is determined that the data cannot be completely sent within one frame, separately embed a user equipment identity UEID and a buffer status report BSR in the transmitted data;

the receiver is further configured to acquire scheduling information of the base station wherein the scheduling information comprises an adjusted second quantity of uplink repetitions that is obtained after the base station parses a part of data embedded with the user equipment identity UEID and the buffer status report BSR; and the sender is further configured to: send, to the base station according to the control channel and the data channel that are of the first quantity of repetitions, the channel distribution information and the part of the transmitted data embedded with the user equipment identity UEID and the buffer status report BSR; and send a remaining part of data to the base station according to the second quantity of repetitions in the scheduling information.

21. The base station according to claim 20, wherein the user equipment further comprises a memory, which is configured to record, as historical data, the first quantity of repetitions of the corresponding control channel and data channel that send the data, so that when re-sending the data, the user equipment invokes the historical data to determine the control channel and data channel that are of the corresponding first quantity of repetition.

22. The base station according to claim 20, wherein:
the processor is further configured to: determine whether the control channel and the data channel that are of the data and of the first quantity of repetitions are recorded; and if the control channel and the data channel that are of the data and of the first quantity of repetitions are not recorded, perform information combining on the continuously received broadcast information, and parse the combined broadcast information according to preset parsing code to determine the control channel and the data channel that are of the corresponding first quantity of repetitions; or if the control channel and the data channel that are of the data and of the first quantity of repetitions are recorded, send data to the base station by re-using the control channel and the data channel that are of the first quantity of repetitions.

23. The base station according to claim 20, wherein:
the processor is further configured to: if sending the data to the base station according to the preset rule by using the control channel and the data channel that are of the first quantity of repetitions fails, perform a preset time of backoff according to random backoff time in the broadcast information; and monitor the broadcast information in the broadcast channel; and
the sender is further configured to re-send the data to the base station according to a random backoff probability in the broadcast information.

24. The base station according to claim 23, wherein:
the processor is further configured to: if a quantity of data retransmissions performed according to the random backoff probability in the broadcast information is greater than a preset maximum threshold, re-select, according to the current first quantity of repetitions of the control channel and the data channel, a control channel and a data channel that are of a third quantity of repetitions that is greater than the first quantity of repetitions; and
the sender is further configured to send the data and the channel distribution information to the base station according to the control channel and the data channel that are of the third quantity of repetitions, so that the base station sends signaling to the user equipment on the re-selected control channel and data channel that are of the third quantity of repetitions, wherein the data is embedded with a user equipment identity UEID.

25. The base station according to claim 20, wherein:
the processor is further configured to: perform an operation of downlink synchronization with the base station, so as to eliminate a time difference between the user equipment and the base station caused by sleeping of the user equipment; and determine, according to a time for the operation of downlink synchronization and a preset relationship between a preset time for the operation of downlink synchronization and channel selection, a control channel and a data channel that are of a fourth quantity of repetitions; and
the receiver is further configured to acquire the time for completing the operation of downlink synchronization.

26. The base station according to claim 25, wherein:
the sender is further configured to send the data and the channel distribution information to the base station according to the control channel and the data channel that are of the fourth quantity of repetitions, so that the base station sends signaling to the user equipment on the re-selected control channel and data channel that are of the fourth quantity of repetitions.

* * * * *

UNITED STATES PATENT AND TRADEMARK OFFICE
CERTIFICATE OF CORRECTION

| | |
|---|---|
| PATENT NO. | : 10,004,000 B2 |
| APPLICATION NO. | : 15/192054 |
| DATED | : June 19, 2018 |
| INVENTOR(S) | : Zhenyu Li et al. |

It is certified that error appears in the above-identified patent and that said Letters Patent is hereby corrected as shown below:

In the Claims

Column 50, Line 46:
In Claim 20, delete "station" and insert -- station, --, therefore.

Signed and Sealed this
Ninth Day of October, 2018

Andrei Iancu
*Director of the United States Patent and Trademark Office*